US006476177B2

(12) United States Patent
Auman et al.

(10) Patent No.: US 6,476,177 B2
(45) Date of Patent: Nov. 5, 2002

(54) MELT-PROCESSIBLE, THERMOPLASTIC RANDOM COPOLYIMIDES HAVING RECOVERABLE CRYSTALLINITY AND ASSOCIATED PROCESSES

(75) Inventors: Brian C. Auman, Pickerington, OH (US); William R Corcoran, Jr., Kennett Square, PA (US); John R Dodd, Wilmington, DE (US); Mark A Guidry, New Castle, DE (US); John D. Summers, Chapel Hill, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/742,860

(22) Filed: Dec. 21, 2000

(65) Prior Publication Data

US 2002/0128424 A1 Sep. 12, 2002

(51) Int. Cl.[7] ................. C08G 73/10; C08G 69/26
(52) U.S. Cl. ............ 528/170; 528/125; 528/128; 528/172; 528/173; 528/176; 528/183; 528/188; 528/220; 528/229; 528/350; 528/353
(58) Field of Search .................. 528/353, 170, 528/125, 128, 171–172, 173, 176, 188, 220, 229, 350, 183

(56) References Cited

U.S. PATENT DOCUMENTS

| | | | |
|---|---|---|---|
| 3,489,725 A | 1/1970 | Lucas | |
| 3,803,085 A | 4/1974 | Takehoshi et al. | |
| 4,073,773 A | 2/1978 | Banucci et at. | |
| 4,281,100 A | 7/1981 | Takekoshi | |
| 4,485,140 A | 11/1984 | Gannett et al. | |
| 4,552,931 A | 11/1985 | St. Clair et al. | |
| 4,837,300 A | 6/1989 | St. Clair et al. | |
| 4,876,330 A | 10/1989 | Higashi et al. | |
| 4,883,718 A | 11/1989 | Ohta et al. | |
| 4,904,758 A | 2/1990 | Kunimune et al. | |
| 4,923,968 A | 5/1990 | Kunimune et al. | |
| 5,077,382 A | 12/1991 | Meterko et al. | |
| 5,106,938 A | 4/1992 | Bookbinder et al. | |
| 5,116,939 A | 5/1992 | Fletcher et al. | |
| 5,145,937 A | 9/1992 | Hergenrother et al. | |
| 5,166,308 A | 11/1992 | Kreuz et al. | |
| 5,171,828 A | 12/1992 | Meterko et al. | |
| 5,202,412 A | 4/1993 | Auman et al. | |
| 5,219,977 A | 6/1993 | Kreuz | |
| 5,260,388 A | 11/1993 | Tamal et al. | |
| 5,268,446 A | 12/1993 | Tamai et al. | |
| 5,268,447 A | 12/1993 | Tamai et al. | |
| 5,298,331 A | 3/1994 | Kanakarajan et al. | |
| 5,302,652 A | 4/1994 | Parish | |
| 5,406,124 A | 4/1995 | Morita et al. | |
| 5,411,765 A | 5/1995 | Kanakarajan et al. | |
| 5,464,928 A | 11/1995 | Chang et al. | |
| 5,478,913 A | 12/1995 | Boyce et al. | |
| 5,478,916 A | 12/1995 | Chang et al. | |
| 5,484,879 A | 1/1996 | Buchanan et al. | |
| 5,502,157 A | 3/1996 | Chang et al. | |
| 5,639,850 A | * 6/1997 | Bryant | 528/353 |
| 5,741,883 A | * 4/1998 | Bryant | 528/353 |
| 6,048,959 A | * 4/2000 | Bryant | 528/353 |

FOREIGN PATENT DOCUMENTS

EP   0 154 720 A1   9/1985
EP   0 459 801 A2   12/1991

OTHER PUBLICATIONS

S. Tamai, T. Kuroki, A. Shibuya, A. Yamaguchi, "Snythesis and characterization of thermally stable semicrystalline polyimide based on 3,4'–oxydianiline and 3,3',4,4'–biphenyltetracarboxylic dianhydride," Polymer 42 (2001), 2373–2378, Elsevier Science Ltd.

V. Ratta, A. Ayambem, J. E. Mc Grath, G. L. Wilkes, Crystallization and multiple melting behavior of a new semicrystalline polyimide based on 1,3–bis(4–aminophenoxy)benzene (TPER) and 3, 3', 4,4'–biphenonetetracarboxylic dianhydride (BTDA), Polymer 42 (2001), 6173–6186, Elsevier Science Ltd.

V. Ratta et al., "A Melt–Processable Semicrystalline Polyimide Structural Adhesive Based on 1,3–Bis(4–aminophenoxy) benzene and 3,3', 4,4'–Biphenyltetracarboxylic Dianhydride," Polymer 40 (1999), pp. 1889–1902 (Publication of Virgina Polytechnic Institute and State University, Blacksburg, VA), The month in the date of publication is not available.

J. Jensen et al., "Adhesive and Composite Properties of LARC—8515 Polyimide," High Performance Polym. 7 (1995), pp. 11–21 (Publication of NASA Langley Research Center, Hampton, VA), The month in the date of publication is not available.

D. Heberer et al., "Crystallization and Morphology of Semicrystalline Polyimides," Macromolecules 24 (1991), pp. 1890–1898 (Publication of University of Akron, Institute and Department of Polymer Science), The month in the date of publication is not available.

B. C. Auman and C. A. Renner, "Polyimides Based on 2,2–Binaphthyl– and Biphenyl Ether Diamines," Polymer Preprints 35(2) (1994), pp. 747–748 (Publication of DuPont iTechnologies and SPEC CHEM), The month in the date of publication is not available.

M. J. Graham et al., "Effect of End Groups on the Thermal Stability of a Semicrystalline Polyimide," Polymer Preprints 38(1) (1997), pp. 306–307 (Publication of Virginia Polytechnic Institute and State University, Blacksburg, VA), The month in the date of publication is not available.

(List continued on next page.)

Primary Examiner—P. Hampton-Hightower

(57) ABSTRACT

Random, melt-processible copolyimides are disclosed herein. These copolyimides are semicrystalline and exhibit recoverable (semi)crystallinity from their melts. Associated processes, which entail either solution polymerization or melt polymerization, for producing and fabricating these copolyimides into useful articles having a predetermined shape are also disclosed.

17 Claims, 2 Drawing Sheets

OTHER PUBLICATIONS

M. J. Graham et al., "Semicrystalline Polyimides Based on Ether Diamines," Polymer Preprints 37(1) (1996), pp. 487–488 (Publication of Virginia Polytechnic Institute and State University, Blacksburg, VA), The month in the date of publication is not available. The publication date is not available.

B. C. Auman and S. Trofimenko, "Soluble, Semi–rigid and Quasi Rod–like Polyimides Based on a Novel Fluorinted Dianhydride," (Publication of DuPont iTechnologies), The month in the date of publication is not available.

R. G. Bryant, "A Soluble Copolyimide," Polymer Preprints 35(1) (1994), pp. 517–518 (Publication of NASA Langley Research Center, Hampton, VA), The month in the date of publication is not available.

B. J. Jensen et al., "Development of a Unique Copolyimide Backbone for Imide Oligomers with Terminal Reactive Groups," Polymer Preprints 35(1) (1994), pp. 539–540 (Joint publication of NASA Langley Research Center, Hampton, VA and College of William and Mary, Williamsbuirg, VA), The month in the date of publication is not available.

* cited by examiner

MELT-PROCESSIBLE, THERMOPLASTIC RANDOM COPOLYIMIDES HAVING RECOVERABLE CRYSTALLINITY AND ASSOCIATED PROCESSES

FIELD OF THE INVENTION

This invention relates to selected copolyimide compositions each of which can be processed as a melt and which exhibit recoverable crystallinity upon cooling from the melt. In preferred embodiments, these copolyimide compositions can also be produced in a melt via melt polymerization.

BACKGROUND OF THE INVENTION

Polyimides constitute a class of valuable polymers being characterized by thermal stability, inert character, usual insolubility in even strong solvents, and high glass transition temperature ($T_g$) among others. Prior art discloses that their precursors have heretofore been polyamic acids, which may take the final imidized form either by thermal or chemical treatment.

Polyimides have always found a large number of applications requiring the aforementioned characteristics in numerous industries, and currently their applications continue to increase dramatically in electronic devices, especially as dielectrics.

Different aspects regarding polyimides and copolyimides may be found in a number of publications, such as for example:

Sroog, C. E., *J. Polymer Sci.*: Part C, No. 16 1191 (1967).

Sroog, C. E., *J. Polymer Sci.: Macromolecular Reviews*, Vol. 11, 161 (1976).

Polyimides, edited by D. Wilson, H. D. Stenzenberger, and P. M. Hergenrother, Blackie, USA: Chapman and Hall, New York, 1990.

Several terms are defined below which are used in accordance with the present invention of high performance polyimides that possess simultaneously the following desirable properties: high thermal stability, such they can be processed in the melt, and which exhibit recoverable semicrystallinity upon crystallization from the melt.

The term "melt-processible polyimide" means that the polyimide has sufficiently high thermoxidative stability and sufficiently low melt viscosity at temperatures at or above the melting point of the polyimide such that the polyimide can be processed in the melt to form a shaped object (e.g., extruded into a pellet, etc.) without the polyimide undergoing any significant degradation.

The term "melt-polymerizable polyimide" means that the polyimide can be formed in a melt in the absence of solvent by reaction of its respective monomers (e.g., dianhydride(s) and diamine(s)) to form initially polyamic acid(s), which are subsequently converted to the polyimide. Furthermore, the polyimide produced has sufficiently high thermoxidative stability and sufficiently low melt viscosity at temperatures at or above the melting point of the polyimide such that the polyimide can be processed in the melt to form a shaped object (e.g., extruded into a pellet, etc.) without the polyimide undergoing any significant degradation.

The term "DSC" is an acronym for differential scanning calorimetry, a thermal analysis technique widely used for accurately determining various thermal characteristics of samples, including melting point, crystallization point, and glass transition temperature. The acronym "DSC" is employed in text that follows below. The following definitions of slow, intermediate, and fast crystallization kinetics and related terms are based upon behavior of a given sample during DSC analysis under slow cooling, quench cooling, reheat, etc. scans during the DSC analysis (see infra for details).

The term "slow crystallization kinetics" means that the crystallization kinetics are such that, for a given copolyimide sample, the sample, when subjected to DSC analysis, essentially does not show any crystallization during slow cooling (i.e., cooling at 10° C./minute) from its melt but does exhibit a crystallization peak on subsequent reheat. Furthermore, no crystallization occurs upon quench cooling.

The term "intermediate crystallization kinetics" means that the crystallization kinetics are such that, for a given copolyimide sample, when subjected to DSC analysis, the sample exhibits some crystallization on slow cooling and furthermore does exhibit some crystallization on reheat after slow cooling. Furthermore, there is no strong evidence for crystallization occurring upon quench cooling.

The term "fast crystallization kinetics" means that the crystallization kinetics are such that, for a given copolyimide sample, when subjected to DSC analysis the sample does exhibit crystallization peaks in both slow and quench cooling and furthermore no observable crystallization peak is seen on subsequent reheat of a given sample following slow cooling. After quench cooling, there may be some crystallization exhibited on reheat.

The term "melt of a polymer" means the polymer exists as the melt in a liquid or substantially liquid state. If the polymer is crystalline or semicrystalline, a melt of the polymer is necessarily at a temperature greater than or equal to its melting point ($T_m$).

The term "recoverable semicrystallinity" and/or "recoverable crystallinity" refers to behavior occurring in a semicrystalline or crystalline polymer and specifically means that behavior that occurs when the polymer, upon heating to a temperature above its melting point and subsequent slow cooling to a temperature well below its melting point, exhibits a melting point in a reheat DSC scan. (If a melting point is not observed during the reheat DSC scan, the polymer does not exhibit recoverable crystallinity. The longer a sample is below $T_m$ but above $T_g$, the greater probability it has to crystallize.)

The term "semicrystalline polymer" means a polymer that exhibits at least some crystalline characteristics and is partially but not completely crystalline. Most or all known polymers having crystalline characteristics are semicrystalline, but not totally crystalline, since they also have at least some amorphous characteristics. (Hence the term crystalline polymer is technically a misnomer in most or all instances where it is used, but nevertheless is often used.)

The melt index of a polymer is defined to be the number of grams of polymer extruded at a specific temperature and load through a die of a specified length and diameter in a time period often minutes. Details of the geometry and test procedures are described in ASTM D1238 (ASTM= American Society for Testing and Materials).

Some significant advantages of melt processing of semicrystalline polyimides having recoverable crystallinity according to the invention include processing without a solvent such that tedious and costly solvent recycling is unnecessary and can be eliminated. High thermal stability is not only essential for processing in the melt at temperatures of greater than or equal to 350° C. but also is required for polyimides used in high temperature applications. Semicrystalline polyimides are often highly desirable in comparison to otherwise comparable polyimides that are amorphous, since the former in relation to the latter often exhibit superior properties, such as having better mechanical properties (e.g., especially higher modulus), capability for use at higher temperatures without property degradation (e.g., better solder resistance, modulus retention), higher solvent resistance, higher creep viscosities (e.g., lower tendencies for distortion of a film or other structure with time), and lower coefficients of thermal expansion.

In order for a semicrystalline polyimide to be considered melt-processable, the polyimide must possess a melting point below a temperature of about 385° C., which temperature is a practical limit for melt processing due to both equipment capabilities/limitations and to avoid any significant thermal degradation of the polyimide. Furthermore, the polyimide also must possess a sufficiently low melt viscosity (i.e., less than or equal to a maximum of about $10^8$ poise (which is equal to $10^7$ Pascal-seconds), but preferably $10^4$ poise (which is equal to $10^3$ Pascal-seconds), depending on polymer melt temperature and shear rates of the melt processing equipment). Copolymerization can be used to lower the melting temperature of a polymer (e.g., polyimide) but usually results in loss of crystallinity. Prior art polyimide compositions have been unable to achieve suitable reduction in the melting points ($T_m$s) of the copolymeric compositions while simultaneously maintaining substantial degrees of semi-crystallinity in the copolymeric compositions. In the compositions of this invention, both suitable melting temperatures and high degrees of semi-crystallinity are achieved by judicious choice of comonomers and their relative amounts in the compositions.

Polyimides that exhibit a melting point in an initial DSC heat scan and which are thereby attributed to have crystalline characteristics are disclosed in Kunimune, U.S. Pat. No. 4,923,968 to Chisso Corporation. While the copolyimides disclosed in this patent may be crystalline or semicrystalline until heated to temperatures above their melting points, the present inventors have not observed the copolyimides disclosed in this patent to exhibit recoverable crystallinity. Indeed these copolyimides are probably substantially amorphous when cooled from their melts. Furthermore, many of the copolyimides disclosed in this patent are not melt-processable, because they have melting points, molecular weights, and/or melt viscosities that are too high for melt-processibility. In addition, endcapping in order to moderate the polymerization and improve melt processability is not taught.

The selected random copolyimides of this invention overcome the drawbacks of the prior art compositions in that these copolyimides possess simultaneously these key essential properties—high thermal stability, melt-processibility, and recoverable crystallinity. The copolyimides of this invention can therefore be processed in the melt to form articles, which may have a predetermined shape, such as extrudates, fibers, films, and molded products comprised of these semicrystalline copolyimides. In many cases, the copolyimides of this invention can also be produced in the melt (via melt-polymerization).

There is a significant long-felt need not met by the current state of polyimide art for high performance polyimides that possess high thermal stability, which can be processed in the melt (melt-processable), and which exhibit recoverable semicrystallinity upon crystallization from the melt. This invention provides a solution to this long-felt need. There is also a long-felt need not met by the current state of polyimide art for high performance polyimides that can be produced by melt polymerization of appropriate monomers in a melt. In many embodiments, this invention also provides a solution to this latter long-felt need.

SUMMARY OF THE INVENTION

In one embodiment, the invention is a melt-processible, thermoplastic copolyimide comprising the reaction product of components comprising:

(I) an aromatic dianhydride component consisting essentially of:
  (A) an aromatic dianhydride selected from the group consisting of 3,3',4,4'-biphenyltetracarboxylic dianhydride (BPDA) and 3,3',4,4'-benzophenone tetracarboxylic dianhydride (BTDA); and
  (B) 4,4'-oxydiphthalic anhydride (ODPA);

(II) an aromatic diamine component selected from the group consisting of 1,3-bis(4-aminophenoxy)benzene (APB-134); 3,4'-oxydianiline (3,4'-ODA); 3,4'-oxydianiline (3,4'-ODA) and 4,4'-oxydianiline (4,4'-ODA) in combination; 3,4'-oxydianiline (3,4'-ODA) and 1,4-diaminobenzene (PPD) in combination; 1,3-bis(4-aminophenoxy)benzene (APB-134) and 4,4'-oxydianiline (4,4'-ODA) in combination; and 1,3-bis(4-aminophenoxy)benzene (APB-134) and 1,4-diaminobenzene (PPD) in combination; and (III) an endcapping component; wherein the copolyimide has a stoichiometry in the range from 93% to 98%, has either a molar ratio of 3,3',4,4'-biphenyltetracarboxylic dianhydride/4,4'-oxydiphthalic anhydride (BPDA/ODPA) of greater than or equal to 60/40 but less than or equal to 95/5 or a molar ratio of 3,3',4,4'-benzophenone tetracarboxylic dianhydride/4,4'-oxydiphthalic anhydride (BTDA/ODPA) of less than or equal to 60/40 but greater than or equal to 20/80, exhibits a melting point in the range of 330° C. to 385° C., and exhibits recoverable crystallinity as determined by DSC analysis. While the present inventors have found no polyimides having recoverable crystallinity outside the above-defined compositional limits in combination with melt-processibility, some compositions within the limits do not exhibit recoverable crystallinity and are therefore not within the scope of the present invention.

As used herein the term "stoichiometry", expressed as a percent, means total moles of dianhydride(s) in relation to total moles of diamine(s) that are incorporated in a given polyimide. If the total moles of dianhydride(s) equals the total moles of diamine(s), the stoichiometry is 100 percent. If these two numbers are not equal, either total diamine(s) or total dianhydride(s) is present in higher amount, and the stoichiometery in this case is expressed as the mole percentage of component(s) (diamine(s) or dianhydride(s)) present in lesser amount relative to that component(s) present in higher amount. As one example, if a polyimide sample is derived from incorporation of 0.98 mole of dianhydride(s) and 1.00 mole of diamine(s), the diamine(s) is present in higher amount and the stoichiometry is 98%.

As used herein the term "endcapping" refers to the monofunctional component(s) (agent(s)) including, but not limited to, phthalic anhydride, naphthalic anhydride, and aniline, which cap the copolyimides to moderate the polymerization and to enhance thermoplasticity of the final melt polymerized product. Endcapping is generally done to 100% such that total moles of anhydride functionality are equal to total moles of amine functionality. Phthalic anhydride and naphthalic anhydride are suitable endcapping components in those cases where diamines are present in greater molar amounts than are dianhydrides. Aniline is a suitable endcapping component in those cases where dianhydrides are present in greater molar amounts than are diamines. The percentage of endcapping component required to afford 100% endcapping is equal to twice the value of (1-stoichiometry) multipled by 100. As an example, for a 100% endcapped copolyimide with 95% stoichiometry (diamine in excess), the total moles of the endcapping agent must be 10 mole percent of the total moles of the diamines, i.e., 10 moles of the endcapping agent to 100 moles of the diamines.

A given melt-processible copolyimide of the invention can in most instances be obtained by melt-polymerization or, alternatively, in all instances by traditional solution polymerization techniques, the latter of which are well known in the art. The melt processing technique of the invention can be used to manufacture an article of predetermined shape.

In the melt polymerization technique, the method of the invention comprises the steps of:
(a) blending, to substantial homogeneity, components comprising:
(I) 93 to 98 mole parts of an aromatic dianhydride component consisting essentially of:
(A) 3,3',4,4'-biphenyltetracarboxylic dianhydride (BPDA); and
(B) 4,4'-oxydiphthalic anhydride (ODPA);
(II) 100 mole parts of an aromatic diamine component selected from the group consisting of 1,3-bis(4-aminophenoxy)benzene (APB-134), 3,4'-oxydianiline (3,4'-ODA); 3,4'-oxydianiline (3,4'-ODA) and 4,4'-oxydianiline (4,4'-ODA) in combination; 3,4'-oxydianiline (3,4'-ODA) and 1,4-diamino-benzene (PPD) in combination; 1,3-bis(4-aminophenoxy)benzene (APB-134) and 4,4'-oxydianiline (4,4'-ODA) in combination; and 1,3-bis (4-aminophenoxy)-benzene (APB-134) and 1,4-diaminobenzene (PPD) in combination; and
(III) 4 to 14 mole parts of at least one endcapping component;
the components (I), (II) and (III) being in substantially solventless form and the blending step producing a substantially solventless component blend; the blending step being carried out at a temperature below the melting point of any of components (I), (II) and (III);
the component (I) and (II) being present in the component blend in a molar ratio of (I):(II) from 0.93 to 0.98;
the component (III) being present in the component blend in a molar ratio (III):(II) of 0.04 to 0.14;
(b) heating the substantially solventless component blend produced in step (a) to a predetermined melt processing temperature at which the (I) aromatic dianhydride component and the (II) aromatic diamine component are melted and will react to form a melt of a polyimide; the predetermined melt processing temperature being less than the temperature at which the polyimide melt chemically decomposes;
(c) mixing the component blend and the polyimide melt produced therefrom during the heating step (b);
(d) removing water of reaction from the component blend and the polyimide melt produced therefrom during said heating step (b);
(e) forming the polyimide melt into an article having predetermined shape;and
(f) cooling the article having predetermined shape to ambient temperature; wherein the dianhydride component has either a molar ratio of 3,3',4,4'-biphenyltetracarboxylic dianhydride/4,4'-oxydiphthalic anhydride (BPDA/ODPA) of greater than or equal. to 50/50 but less than or equal to 95/5 or a molar ratio of 3,3',4,4'-benzophenone tetracarboxylic dianhydride/4,4'-oxydiphthalic anhydride (BTDA/ODPA) of less than or equal to 60/40 but greater than or equal to 20/80, the polyimide exhibits a melting point in the range of 330° C. to 385° C., and the polyimide exhibits recoverable crystallinity as determined by DSC analysis.

DETAILED DESCRIPTION OF THE INVENTION

Figure 1:
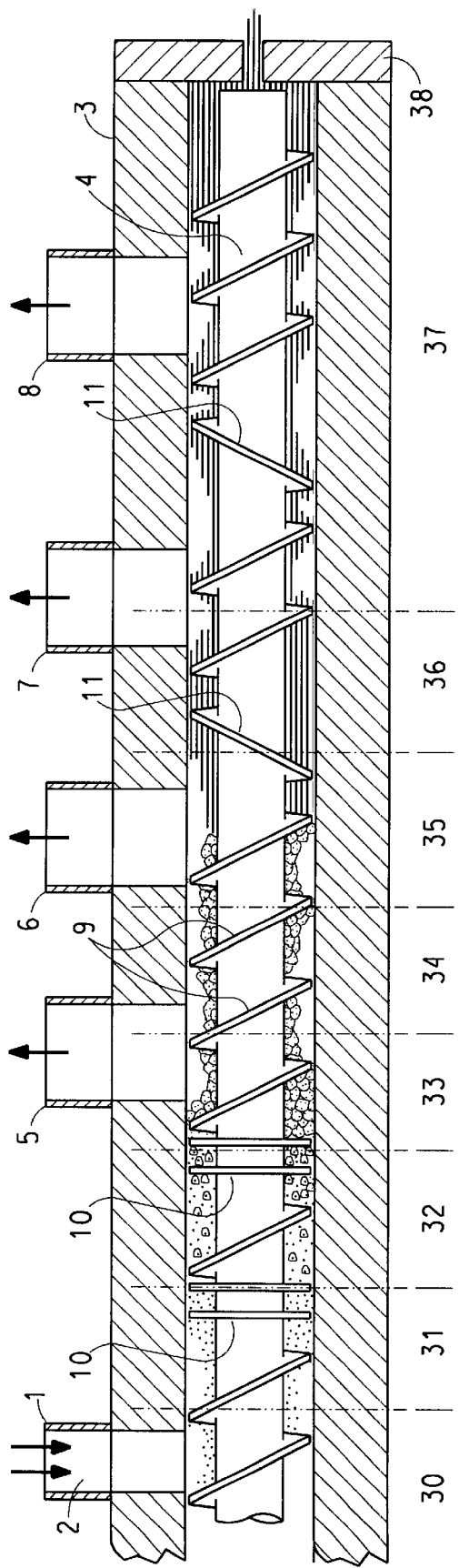
FIG. 1 is a side view drawing of a twin-screw extruder having a plurality of longitudinal barrel zones and vent port openings.

The melt-processible, thermoplastic copolyimides of this invention are the reaction products of components comprising an aromatic dianhydride component, an aromatic diamine component, and an endcapping component. The aromatic dianhydride component consists of A) an aromatic dianhydride selected from the group consisting of BPDA and BTDA, and B) ODPA. The aromatic diamine component is selected from the group consisting of APB-134; 3,4'-ODA; 3,4'-ODA and 4,4'-ODA in combination; 3,4'-ODA and PPD in combination; APB-134 and 4,4'-ODA in combination; and APB-134 and PPD in combination. Suitable endcapping components when diamine(s) is in excess include, but are not limited to, phthalic anhydride and naphthalic anhydride. A suitable endcapping component when dianhydride(s) is in excess includes, but is not limited to, aniline. A given copolyimide is produced by reaction of the dianhydride and diamine components as well as the endcapping component to form initially a poly(amic acid). Depending upon specific conditions, the poly(amic acid) can either be subsequently converted to polyimide (as is typical when the poly(amic acid) is formed in solution) or the poly(amic acid) can be essentially simultaneously further transformed to polyimide as it is being formed (as is typical under melt polymerization conditions).

The copolyimides of this invention are characterized to be semicrystalline, to exhibit recoverable crystallinity, and to possess all requisite essential properties in order for them to be melt-processible. There is criticality of several parameters that define these copolyimides in order that they can possess all three of these key properties simultaneously. Critical parameters include choice of comonomers (e.g., dianhydride(s) and diamine(s)), amounts of different comonomers, and the stoichiometry of diamine(s) and dianhydride(s) in relation to one another. Endcapping is also an important consideration in order to improve molecular weight control and melt stability. With proper choices of these critical parameters, the copolyimides possess essential properties for melt-processibility, including melting points in the range of 330° C. to 385° C. and sufficiently low melt viscosities (i.e., less than about $10^8$ poise and preferably less than about $10^4$ poise) to permit melt processing. In addition, these copolyimides are semicrystalline and also exhibit recoverable crystallinity, i.e., these copolyimides can be crystalline or maintain their ability to crystallize when cooled below their melting points from their respective melts. The choice of comonomer(s) and their ratios for these copolyimides is particularly critical with respect to semicrystallinity and having recoverable crystallinity.

The stoichiometry of the inventive copolyimides is another critical parameter and must be in the range from 93% to 98%. Either dianhydrides or diamine(s) can be in excess, but preferably diamines are in excess and the copolyimides are capped with an endcapping agent (endcapping component). Suitable endcapping agents in cases where diamine(s) is in excess include, but are not limited to, phthalic anhydride, and naphthalic anhydride (e.g., 2,3-naphthalic anhydride); phthalic anhydride is preferred (with diamine in excess). A suitable endcapping agent in cases where dianhydride(s) is in excess includes, but is not limited to, aniline. A copolyimide of this invention having stoichiometry higher than 98% will in general have too high a melt viscosity, while one having stoichiometry less than 93% will generally have poor mechanical properties, especially flexural endurance. Stoichiometry will also impact at least to some extent the crystallization kinetics. Higher stoichiometry may generally translate to slower crystallization kinetics and to higher polymer viscosity (which results in lower polymer chain mobility).

Copolyimides of the invention are produced from ODPA as one dianhydride comonomer and they also are produced from a second dianhydride selected from the group consisting of BPDA and BTDA. BPDA is preferred. These copolyimides also are produced from an aromatic diamine component selected from the group consisting of APB-134; 3,4'-ODA; 3,4'-ODA and 4,4'-ODA in combination; 3,4'-ODA and PPD in combination; APB-134 and 4,4'-ODA in combination; and APB-134 and PPD in combination. For members of the (Markush) group that are single diamines, APB-134 is preferred, and for members of the (Markush) group that are two different diamines in combination, 3,4'-ODA and 4,4'-ODA are preferred.

For copolyimides of this invention where the aromatic dianhydride component is ODPA and BPDA and the aromatic diamine component is APB-134, the molar ratio of BPDA/ODPA is in the range from 95/5 to 60/40, preferably is in the range from 90/10 to 65/35, and more preferably is in the range from 85/15 to 70/30. When the molar ratio of BPDA/ODPA is higher than 95/5, the copolyimides are too high melting to be readily melt-processable. When the molar ratio of BPDA/ODPA is less than 60/40, the copolyimides have at best relatively low degrees of semicrystallinity, crystallize slowly, or may be amorphous polymers.

For the copolyimides of this invention, it has fortuitously been found that the BPDA/ODPA molar ratio can be employed to effectively tailor kinetics of crystallization of a given copolyimide from its melt. As illustrated in the examples, DSC analysis under standard multiscan test conditions of several of these copolyimides over a range of compositions indicated that the kinetics of crystallization are effectively controlled by the BPDA/ODPA molar ratio of comonomers incorporated into these compositions. In the standard DSC test, a given sample is first heated in a first heat scan at 10° C./minute, then cooled in a cooling scan at 10° C./minute, then reheated (second heat scan) at 10° C./minute, then quench cooled, and finally reheated again (third heat scan) at 10° C./minute.

Each of the copolyimides of the invention, wherein the molar ratio of BPDA/ODPA is in the range from 75/25 to 95/5 and the stoichiometry ranges from about 93% to about 98%, exhibits a crystallization peak upon cooling from a melt of the copolyimide in a cooling scan with cooling at 10° C./minute during DSC analysis and do not exhibit a crystallization peak upon subsequent reheat above 180° C. to the melt in a reheat scan (second heat scan) during DSC analysis. Yet the copolyimide does indeed have recoverable semicrystallinity as evidenced by the copolyimide exhibiting a melting point during the course of the subsequent DSC reheat scan. Such a copolyimide is characterized to exhibit fast kinetics of crystallization (as defined supra) from the melt of the copolyimide. In some applications, copolyimides having such fast crystallization kinetics may be desirable in that a semi-crystalline polymer may readily be obtained during processing (e.g., injection molding) upon cooling. For these copolyimides, preferably, the stoichiometry is about 94% to about 96%, and, more preferably, the stoichiometry is about 95%.

Each of the copolyimides of the invention, wherein the molar ratio of BPDA/ODPA is in the range from 70/30 to 50/50 and the stoichiometry ranges from about 93% to about 98%, does not exhibit a crystallization peak upon cooling from a melt of the copolyimide in a cooling scan with cooling at 10° C./minute during DSC analysis but does exhibit a crystallization peak upon subsequent reheat above 180° C. to the melt in a reheat scan (second heat scan) during DSC analysis, whereby the copolyimide is characterized to exhibit slow kinetics of crystallization from the melt of the copolyimide. (Lower stoichiometries may crystallize faster.) In some other applications, copolyimides having such slow crystallization kinetics may be desirable in that some compositions may too readily afford a semi-crystalline polymer during processing and/or where slowing down the crystallization process may ease processing and provide greater process latitude by deliberating slowing and tailoring the rate of crystallization of these copolyimides according to the invention as discussed supra. A copolyimide exhibiting slow crystallization kinetics is also potentially good, for example, for subsequent stretching/crystallization of a film. For these copolyimides, preferably, the stoichiometry is about 94% to about 96%, and, more preferably, the stoichiometry is about 95%.

For copolyimides of this invention where the aromatic dianhydride component is ODPA and BPDA and the aromatic diamine component is 3,4'-ODA, the molar ratio of BPDA/ODPA is in the range from 85/15 to 95/5. When the molar ratio of BPDA/ODPA is less than 85/15, the copolyimide has too low a level of crystallinity to provide desired mechanical properties and is considered to be amorphous. When the molar ratio of BPDA/ODPA is greater than 95/5, the copolyimide is generally too high melting for melt-processibility.

For copolyimides of this invention where the aromatic dianhydride component is ODPA and BPDA and the aromatic diamine component is 3,4'-ODA and 4,4'-ODA in combination, i.e., both diamines are comonomers, the molar ratio of BPDA/ODPA is in the range from 80/20 to 95/5, and the molar ratio of 3,4'-ODA/4,4'-ODA is in the range from 95/5 to 75/25. Preferably, the molar ratio of BPDA/ODPA is greater than or equal to 85/15, and the molar ratio of 3,4'-ODA/4,4'-ODA is greater than or equal to 80/20.

For copolyimides of this invention where the aromatic dianhydride component is ODPA and BPDA and the aromatic diamine component is 3,4'-ODA and PPD in combination, i.e., both diamines are comonomers, the molar ratio of BPDA/ODPA is in the range from 80/20 to 95/5, and the molar ratio of 3,4'-ODA/PPD is in the range from 95/5 to 90/10.

For copolyimides of this invention where the aromatic dianhydride -component is ODPA and BTDA and the aromatic diamine component is APB-134, the molar ratio of BTDA/ODPA is in the range from 60/40 to 20/80, preferably is in the range from 50/50 to 25/75, and more preferably is in the range from 40/60 to 30/70. When the molar ratio of BTDA/ODPA is greater than 60/40, the copolyimide has generally too high a melting point for melt-processibility. When the molar ratio of BTDA/ODPA is less than 20/80, the copolyimide has too low a degree of crystallinity to provide desired mechanical properties or is considered to be amorphous.

The melt-processible, semicrystalline copolyimides of this invention are typically produced by reaction between the aromatic dianhydride component, the aromatic diamine component, and the endcapping component. In cases where BPDA is the aromatic dianhydride of the aromatic dianhydide component, these reactions can be carried out in solution or in a melt. As an illustrative example of production in solution, the aromatic dianhydride component can be BPDA and ODPA, wherein the molar ratio of BPDA/ODPA is chosen to be greater than or equal to 50/50 but less than or equal to 95/5, the aromatic diamine component can be APB-134, and the endcapping component can be phthalic anhydride (with diamine(s) in excess).

As illustrated in many textbooks and other references (e.g., for example, see Polyimides, edited by D. Wilson, H. D. Stenzenberger, and P. M. Hergenrother, Blackie, USA: Chapman and Hall, New York, 1990), reaction of a dianhydride(s) with a diamine(s) in solution initially affords a poly(amic acid). Typical reaction temperatures are ambient temperature to about 100° C. The poly(amic acid) that results can subsequently be converted to the corresponding polyimide (and water) by either heating the poly(amic acid) to elevated temperature(s) (e.g., about 200–400° C.) and/or subjecting the poly(amic acid) to chemical imidization using reagents such as triethylamine in combination with acetic anhydride. These are two step processes of obtaining a polyimide and require the removal of solvent for processing into usable forms such as thin films and sheet products.

Another method of forming a polyimide is to form it directly by blending and reacting comonomers (dianhydride (s), diamine(s), and endcapping agent(s)) at elevated temperatures in the absence of a solvent. This method is melt polymerization. (Although the preferred method of melt polymerization utilizes dianhydride(s) as comonomer(s), tetracarboxylic acids and their derivatives (e.g., diesters) may also be suitable.) In this case, the comonomers react under continually increasing reaction temperatures and form poly(amic acid) which is, within a short time interval, essentially completely converted to polyimide and water, such that there is in effect no substantial buildup of poly (amic acid) in the reaction mixture. This method can be conducted under batch or continuous conditions, with continuous conditions being preferred for high volume. Under preferred conditions, this method is conducted continuously with monomers being fed into an inlet end of a continuous reactor having increasing temperature zones and which is maintained at elevated temperatures above the melting point of the polyimide being produced and reaction occurs with removal of by-product water such that essentially pure polyimide as a melt exits at the other (exit) end of the continuous reactor. Upon exiting the reactor, one or more other unit operations can be performed on the melt of the polyimide which can afford an object having a predetermined shape. These include, but are not limited to, casting the polyimide into a film, a fiber, a sheet, a tube, an extrudate strand that is cut into a pellet, a coating on a wire, a compression-molded article, and a blow-molded article.

Additional Melt Polymerization Details

In some embodiments, this invention provides for a melt polymerization production of linear polyimides by reaction of certain aromatic diamines with certain aromatic dianhydrides, with an endcapping component also being present, at elevated temperature in the absence of any solvent. Melt polymerization, largely a solventless process, therefore produces thermoplastic polyimides without the need for solvents, as is required for current ones prepared by the classical solvent-based two-step approach or, in the case of soluble polyimides, by single stage high temperature solution polymerization using solvent/azeotroping agent systems. With the exclusion of BTDA, any inventive combination of monomers in any stoichiometry that yields a melt index greater than about three (3) at temperatures up to the decomposition temperature of the polymer is feasible for use in melt polymerization embodiments of this invention. An endcapping agent (component) is incorporated to moderate the polymerization and to enhance thermoplasticity of the final melt polymerized product.

Melt polymerization can be a batch process in a reactor, or a continuous process in an extruder or continuous mixer, or some combination to complete the melt polymerization in single pass or multiple passes. Polyimides made by either process may be amorphous, semicrystalline, and crystallizable compositions that are also melt processible, thus may be directly processed to yield a variety of useful shaped articles including films, coatings, tubing, adhesives, laminates, fibers, reinforced composites, tapes, molded parts and associated applications including electronic packaging, wire insulation and bearings. Or, the process may produce a resin in pellet form (also a shaped article) that can be secondarily processed into any or all of these same products at the same or alternate facilities. These pellets may be shipped, stored and handled much like any other polymer without the need for special requirements for some current intermediate polyimide solutions. This invention also yields a polyimide production process that is more environmentally friendly without the solvents and their handling, containment and recovery issues. And, the ability to melt this product also suggests the possibility of facile recycling, which is currently possible but very tedious and inconvenient.

A preferred melt polymerization process is a continuous one using an extruder, either twin-screw or single-screw, although a twin-screw with a plurality of longitudinal barrel zones is preferred. Suitable combinations (e.g., as disclosed elsewhere in the specification and/or as exemplified in the examples) of the aromatic diamine(s) with the aromatic dianhydride(s) are directly fed continuously into the extruder where they are melted, mixed and reacted to yield a molten polyimide. These ingredients may be fed into the extruder in one of several ways; individually with loss-in-weight feeders into a single feed point or at separate points, as a pre-blended single feed from either volumetric or loss-in-weight feeders, and/or some combination of partially pre-blended and individual ingredients in a single pass process. A multiple pass process to complete the melt polymerization is also possible. The extruder barrel zones are progressively increased in temperature to allow the reaction process to proceed in sequence until molten polymer flows freely out of the die. Extruder screws are designed to provide the necessary feed and melt conveying, melting and mixing (such as kneading blocks or mixers), and pumping to suit the process and residence time. Vent port openings along the way, combined with properly placed sealing elements (such as reverse flighted elements) in the screw to create partially filled zones at these vent ports, are employed to continuously remove the by-product water of reaction.

Figure 2:
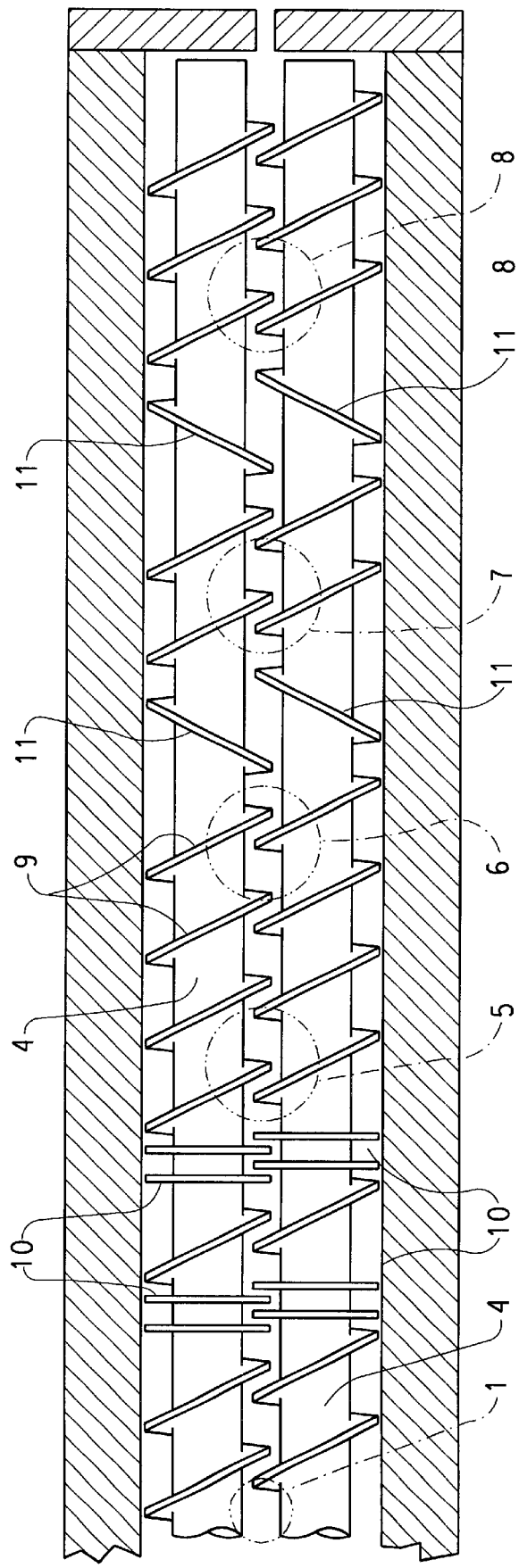
FIG. 2 is a plan view drawing of a twin-screw extruder.

Illustratively, FIG. 1 depicts in a side view schematically a typical twin-screw extruder having a plurality of longitudinal barrel zones and vent port openings that are set-up in one of several possible arrangements. FIG. 2 illustrates a plan view of the two screws 4 of the twin-screw extruder.

A general description of the reactive extrusion melt polymerization process of this invention is given immediately below (for an illustrative, non-limiting case of a continuous reaction in an extruder) and specific cases are exemplified in some examples. The monomers, kept under an inert atmosphere, are fed continuously at the prescribed rates and compositional ratios through a closed connection, 1, into an extruder feed port opening 2. Heating and cooling means (not shown) are provided along the barrel, 3, for controlling the various zones depicted in order to control the reaction process as it proceeds through the extruder. The extruder feed zone 30 is kept at or below room temperature, while the immediate adjacent zone 31 is generally below the lowest melting point of the various formulation ingredients, as low as 50° C., so as to avoid adversely impacting ingredient feed. The remaining zone temperatures are then progressively increased with increase in ascending zone number (as labeled in FIG. 1) to attain the melt polymerization temperature of the particular polyimide being formed and to achieve conveyance of the mixture through the remainder of the extruder zones and steady molten polymer flow through the die discharge. The zones maintained at elevated temperatures (except for zones 30 and 31) may range from as low as about 100° C. to as high as about 380° C. FIG. 1 illustrates an extruder having a feed zone 30 and seven additional zones (31–37). The temperature of die 38 during melt polymerization may be as high as 400° C., but is preferably maintained in the 340° C. to 380° C. range.

The extruder screws 4 are rotated at a rotation speed (measured as RPM) chosen to provide sufficient residence time to complete the reaction process of polyimide formation via melt polymerization. Extruder screw rotation speeds can range from as low as about 50 RPM to as high as about 500 RPM, although a rotation speed in the range from about 100 RPM to about 250 RPM is preferred. As is known to one skilled in the art of extrusion technology, optimal choice of extruder screw speed is also dependent on the screw element types and their positioning, as well as ingredient composition and throughput rates used, and these extruder screws are designed to provide the necessary feed and melt conveying, depicted as 9 in FIGS. 1 and 2, melting and mixing (such as kneading blocks or mixers, 10), and pumping to suit the process and residence time.

Vent port openings, (5, 6, 7 and 8 as illustrated in FIG. 1), along the length of the extruder are employed to continuously remove the substantial amount of water of reaction produced as a co-product in the melt polymerization process. This water is efficiently removed by continuous venting through several vent ports that are spaced along the extruder. Normally, at least two vent ports are required but there can be additional vent ports, i.e., four or even more can be employed. It has also been demonstrated that the first one or two ports removes the majority of the water of reaction at low vacuum, or even atmospheric pressure. The additional port(s) is preferably operated under vacuum to remove any additional water of reaction and/or bubbles that may be formed. Also, as is known to one skilled in the art of extrusion technology, there are special screw elements located immediately prior to these ports to completely fill the elements thereby creating a melt seal to limit the amount of polymer flow under the port to maximize the efficiency of water and/or bubble removal and to prevent plugging of the port. These include kneading blocks 10, or reverse flights as depicted as 11 in FIG. 2 which create back pressure on the polymer to fill the elements. Placement of the vent ports is determined by the formulation and throughput rates used relative to the screw elements and screw speed.

This process may be used to yield pre-determined shapes of a variety of useful articles including films, coatings, tubing, adhesives, laminates, fibers, reinforced composites, tapes, molded parts and associated applications including electronic packaging, wire insulation and bearings. Or, the process may produce a resin in pellet form that can be secondarily processed into any or all of these same products at the same or alternate facilities.

In most cases, the melt polymerization process of this invention is a first pass production process. Alternatively, the melt polymerization process can be a multiple step process, in which case the process is preferably two steps. In this latter case, the first step melt polymerization can yield a low molecular weight polymer. The second step involves melt polymerizing a mixture of this low molecular weight polymer with the addition of a sufficient amount of at least one other monomer to produce the desired stoichiometry and molecular weight. Conceptually, this second step can be directly coupled to the first melt polymerization device, or uncoupled and done off-line at a later time and/or another facility. This two-step process may be advantageous, and/or preferred, when that second step is used to produce a final product conducive to an extrusion type process, such as film, coated wires, tubing, and fiber.

GLOSSARY

Diamines
    APB- 133—1,3-bis(3-aminophenoxy)benzene
    APB-134—1,3-bis(4-aminophenoxy)benzene (=RODA)
    RODA—1,3-bis(4-aminophenoxy)benzene (=APB134)
    3,4'-ODA—3,4'-oxydianiline
    4,4'-ODA—4,4'-oxydianiline
    PPD—1,4-diaminobenzene
Dianhydrides
    BPDA—3,3',4,4'-biphenyltetracarboxylic dianhydride
    BTDA—3,3',4,4'-benzophenone tetracarboxylic dianhydride
    ODPA—4,4'-oxydiphthalic anhydride
General
    AA—Acetic anhydride
    CTE—Coefficient of thermal expansion
    DSC—Differential scanning calorimetry
    hrs—hours
    RPM—Revolutions per minute
    TEA—Triethylamine
    g—gram
    GPa—Gigapascals
    GPC—Gel permeation chromatography
    MI—Melt Index (or melt flow index of melt flow rate)
    $M_n$—Number average molecular weight (determined by GPC unless otherwise indicated)
    $M_w$—Weight average molecular weight (determined by GPC unless otherwise indicated)
    MPa—Megapascals
    $T_g$—Glass transition temperature (° C.)
    $T_m$—Melting point (° C. unless otherwise specified)
    $T_c$—Crystallization temperature (° C. unless otherwise specified)

Polyimide
  M/N/O/P w/x/y/z—Polyimide that is reaction product of M at w parts, N at x parts, O at y parts, and P at z parts, where M, N, O, and P are monomers and all parts are mole parts (unless otherwise indicated)
Solvents
  DMAC—N,N-dimethylacetamide
  NMP—N-methyl-2-pyrollidinone

SELECTED DIANHYDRIDE STRUCTURES

| Dianhydride | Dianhydride Structure |
|---|---|
| BPDA | (structure shown) |
| BTDA | (structure shown) |
| ODPA | (structure shown) |

All percentages are mole percentages unless otherwise indicated. All ratios are molar ratios unless otherwise indicated. All temperatures are in degrees Centigrade (° C.) unless otherwise indicated. The phrase "a melt of a polyimide" is equivalent to the phrase "a polyimide melt".

A standard DSC testing protocol was utilized as indicated for specific examples. A description of this standard DSC testing protocol follows:

A given powder polyimide sample was subjected to DSC analysis to determine melting point, glass transition temperature, and crystallization characteristics of the sample in relation to its structural characteristics. Unless otherwise indicated, the DSC analysis employed for each sample was that which follows:

An initial DSC analysis at 20° C./minute from ambient temperature to 500° C. was done to determine the appropriate upper temperature limit ($T_{ul}$) for the sample to be brought to during the multiple scan DSC analysis. This $T_{ul}$ was chosen to be below the temperature above which appreciable decomposition would occur, but above the temperature(s) of all significant transitions (melting, glass transition, etc.).

In each case unless otherwise indicated, a fresh sample was used in the multiple scan DSC, keeping the maximum temperature attained in the initial and second heat scans at or below $T_{ul}$. The multiple scan DSC analysis was run in the following manner:

1) An initial heat scan from ambient temperature to $T_{ul}$ at 10° C./minute.
2) A slow cool scan from $T_{ul}$ to ambient temperature at 10° C./minute.
3) A second heat scan from ambient temperature to $T_{ul}$ at 10° C./minute.
4) A quench cool scan from $T_{ul}$ to ambient temperature. (Quench cool scan was done by placing a dry ice dewar on top of the DSC cell to allow cooling at a fast but uncontrolled rate.)
5) A third heat scan from ambient temperature to 500° C. at 10° C./minute.

All DSC measurements were obtained on a DuPont 9900 DSC unit (E. I. du Pont de Nemours and Company, Wilmington, Del.). DuPont's former DSC business is now owned by TA Instruments, Wilmington, Del.

All of the melt index numbers reported or referenced herein were determined under a load of 8,400 grams at the specified temperature, i.e., either 350° C. or 375° C., and were conducted on a commercial automated melt index tester, or plastometer, a Tinius-Olsen Extrusion Plastometer Model MP-993.

For the DSC analysis of each of the polyimide samples from Examples 35–40, an automated multiple scan DSC analysis was run in the following manner:

Sample is heated and equilibrated to 80° C.
An initial heat scan is run from 80° C. to 415° C. at 10° C./minute.
The sample is held at 415° C. for 6 minutes.
A slow cool scan is run from 415° C. to 80° C. at 10° C./minute.
A second heat scan is run from 80° C. to 415° C. at 10° C./minute.

All DSC measurements were obtain on a TA Instruments A-2920 DSC unit (Thermal Analysis Instruments Company, New Castle, Del.). EXAMPLE 1

Preparation of Polyimide Based on BPDA/ODPA// APB-134/PA 76/19//100/10 (80/20 BPDA/ODPA Ratio)—(95% of Stoichiometric Dianhydride)

Into a 250 ml round bottom flask equipped with a mechanical stirrer and nitrogen purge were charged 10.1703 g (0.03479 mole) of diamine APB-134 and 60 ml of NMP. After dissolution of the diamine, 7.7791 g (0.02644 mole) of BPDA, 2.0505 g (0.00661 mole) of ODPA and 0.5153 g (0.00348 mole) PA were added with stirring under nitrogen and rinsed in with 20 ml NMP. The reaction was allowed to proceed overnight with stirring under nitrogen. The following day, 13.1 ml (0.139 mole) acetic anhydride and 19.4 ml (0.139 mole) of triethylamine were added to the poly(amic acid) solution to effect imidization. After about one half hour, the polymer precipitated, any clumps were broken up by manual manipulation of the mechanical stirrer and stirring was continued for about 6 hours. The resulting polymer slurry was then added to methanol in a blender to complete precipitation and remove NMP. The polymer was separated by filtration, washed with methanol, and then dried at ~200° C. overnight under vacuum with a nitrogen bleed. DSC analysis (10° C./min.) of the resulting polyimide showed a melting point of 363° C. during the first heating scan, a crystallization exotherm upon the subsequent cooling at 286° C. and a melting point of 361° C. during the subsequent reheat indicating recoverable crystallinity from the melt.

EXAMPLE 2

Preparation of Polyimide Based on BPDA/ODPA// APB-134/PA 80.75/14.25//100/10—(85/15 BPDA/ ODPA Ratio)—(95% of Stoichiometric Dianhydride).

In a similar manner to Example 1 a polyimide was prepared with 10.1703 g of APB-134, 8.2653 g of BPDA, 1.5379 g ODPA and 0.5153 g of PA. DSC analysis (10° C./min.) of the resulting polyimide showed a melting point of 371° C. during the first heating scan, a crystallization exotherm upon the subsequent cooling at 309° C. and a melting point of 370° C. during the subsequent reheat indicating recoverable crystallinity from the melt.

EXAMPLE 3

Preparation of Polyimide Based on BPDA/ODPA// APB-134/PA 71.25/23.75//100/10—(75/25 BPDA/ ODPA Ratio)—(95% of Stoichiometric Dianhydride)

In a similar manner to Example 1 a polyimide was prepared with 9.9004 g of APB-134, 7.0994 g of BPDA, 2.4952 g ODPA and 0.5016 g of PA. (Gel permeation chromatography (GPC) analysis of the intermediate poly (amic acid) solution (prior to imidization) indicated the weight average molecular weight was 83,400.) DSC analysis (10° C./min.) of the resulting polyimide showed a melting point of 350° C. during the first heating scan, a crystallization exotherm upon the subsequent cooling at 247° C. and a melting point of 354° C. during the subsequent reheat indicating recoverable crystallinity from the melt.

EXAMPLE 4

Preparation of Polyimide Based on BPDA/ODPA// APB-134/PA 66.5/28.5//100/10—(70/30 BPDA/ ODPA Ratio)—(95% of Stoichiometric Dianhydride)

Into a 250 ml 4-neck round bottom flask equipped with a mechanical stirrer, nitrogen purge, and thermometer were charged in sequence 50 ml of NMP, 10.0397 g (0.03412 mole) of BPDA, and 4.5365 g (0.01462 mole) of ODPA. Additional NMP (8 ml) was used as rinse for essentially quantitatively transferring dianhydride powders to the reaction flask (and was added to the reaction flask). The resulting reaction mixture was a slurry. Phthalic anhydride (0.7600 g, 0.00513 mole) and 4 ml of NMP were added to the stirred reaction mixture. A solution of 15.0 g (0.05131 mole) of APB-134 in 55 ml of NMP was added using an addition funnel to the stirred reaction mixture over 10 minutes. An additional 4 ml of NMP was added as rinse for the diamine solution, such that the total amount of NMP in the reaction mixture at this point was 121 ml. The resulting reaction mixture (polyamic acid) was stirred overnight at ambient temperature.

A 50.0 gram sample of the resulting reaction mixture was chemically imidized in a 100 ml round bottom flask equipped with a nitrogen purge and mechanical stirrer using 6.20 ml of acetic anhydride and 9.20 ml of triethylamine that were volumetrically measured using 10 ml graduated pipettes and added to the stirred mixture. The resulting reaction mixture was stirred for 6 hours at ambient temperature during which time stirring was stopped and clumps of solid material were broken up, if any were observed in significant amounts. The resulting reaction mixture was poured into methanol in a Waring blender for precipation of polyimide. Precipitated polyimide was collected by vacuum filtration using a Buchner funnel with filter paper and then dried over two nights in vacuo. On the first night, the drying was at 100° C. in a vacuum drying oven; on the second night, the drying was at ~200–210° C. in a vacuum drying oven.

DSC analysis (10° C./min) of the resulting polyimide showed a melting point of 354° C. during the first heating scan. A crystallization exotherm was not observed during subsequent slow cooling at 10° C./min to ambient temperature following the first heating scan, but a crystallization exotherm was observed in the second heat scan upon heating to 235° C., followed by a melting point of 351° C. Furthermore, a crystallization exotherm was not observed during quench cooling to ambient temperature following completion of the second heat scan. In a third heat scan at 10° C./min, there was observed a crystallization exotherm at 247° C. These results indicate there was recoverable crystallinity from the melt, but that the kinetics of crystallization were slow, such that crystallization did not occur substantially during cooling but did upon reheating to a temperature of approximately 235–247° C.

EXAMPLE 5

Preparation of Polyimide Based on BPDA/ODPA// APB-134/PA 61.75/33.25//100/10—(65/35 BPDA/ ODPA Ratio)—(95% of Stoichiometric Dianhydride)

In a similar manner to Example 4, a polyimide was prepared with 9.3220 g of BPDA, 5.2925 g of ODPA, 15 g of APB 134, and 0.76 g of PA. The amounts of reagents for chemical imidization were the same as in Example 4 (i.e., 6.20 ml of AA (added first) and 9.20 ml of TEA (added second)).

DSC analysis (10° C./min) of the resulting polyimide showed a melting point of 350° C. during the first heating scan. A crystallization exotherm was not observed during subsequent slow cooling at 10° C./min to ambient temperature following the first heating scan, but a crystallization exotherm (peak) was observed in the second heat scan upon heating to 253° C., followed by a melting point of 350° C. Furthermore, a crystallization exotherm was not observed during quench cooling to ambient temperature following completion of the second heat scan. In a third heat scan at 10° C./min, there was observed a crystallization exotherm at 281° C. These results indicate there was recoverable crystallinity from the melt, but that the kinetics of crystallization were slow, such that crystallization did not occur substantially during either slow cooling or quench cooling but did upon reheating to a temperature of approximately 253–281° C.

EXAMPLE 6 (Comparative)

Preparation of Polyimide Based on BPDA/ODPA// APB-134/PA 33.25/61.75//100/10—(35/65 BPDA/ ODPA Ratio)—(95% of Stoichiometric Dianhydride)

In a similar manner to Example 1 a polyimide was prepared with 9.7943 g of APB-134, 3.2775 g of BPDA, 6.4179 g ODPA and 0.4962 g of PA. DSC analysis (10° C./min.) of the resulting polyimide showed a melting point of 295° C. during the first heating scan, but did not show either crystallization upon subsequent cooling or a melting peak during subsequent reheat indicating that any crystallinity initially present in this sample was not readily recoverable from the melt.

EXAMPLE 7 (Comparative)

Preparation of Polyimide Based on BPDA/ODPA// APB-134/PA 23.75/71.25//100/10—(25/75 BPDA/ ODPA Ratio)—(95% of Stoichiometric Dianhydride)

In a similar manner to Example 1 a polyimide was prepared with 10.0245 g of APB-134, 2.3961 g of BPDA, 7.5793 g ODPA and 0.5079 g of PA. DSC analysis (10° C./min.) of the resulting polyimide showed a melting point of 304° C. during the first heating scan, but did not show either crystallization upon subsequent cooling or a melting peak during subsequent reheat indicating that any crystallinity initially present in this sample was not readily recoverable from the melt.

EXAMPLE 8 (Comparative)

Preparation of Polyimide Based on ODPA//APB-134/PA 95//100/10 (No BPDA)-(95% of Stoichiometric Dianhydride)

In a similar manner to Example 1 a polyimide was prepared with 9.6074 g of APB-134, 9.6807 g ODPA and 0.4867 g of PA. DSC analysis (10° C./min.) of the resulting homopolyimide (end-capped with phthalic anhydride) showed a melting point of 337° C. during the first heating scan, but did not show either crystallization upon subsequent cooling or a melting peak during subsequent reheat indicating that any crystallinity initially present in this sample was not readily recoverable from the melt.

EXAMPLE 9 (Comparative)

Preparation of a Polyimide Film Based on BPDA/ODPA/APB-134—(75/25 BPDA/ODPA Ratio)-(99% of Stoichiometric Dianhydride, Thermal Imidization)—For comparison to Example 3

Into a 250 ml round bottom flask equipped with a mechanical stirrer and nitrogen purge were charged 9.9004 g of APB-134 and ~72 ml of NMP. After dissolution of the diamine, 7.3236 g of BPDA, and 2.5739 g ODPA (98% of stoichiometric dianhydride) were added with stirring under nitrogen and rinsed in with ~8 ml NMP (80 ml NMP total). The reaction was allowed to proceed overnight with stirring under nitrogen. The following day, the reaction mixture was diluted to 15% solids with 32 ml NMP and the 0.0747 g of BPDA and 0.0262 of ODPA were added to increase the dianhydride stoichiometry to 99%. The reaction was again allowed to proceed overnight resulting in a highly viscous solution. (Gel permeation chromatography (GPC) analysis of the intermediate poly(amic acid) solution (prior to imidization) indicated the weight average molecular weight was 309,000.) Unlike Example 3 which has a similar chemical composition, but contains only 95% of the stoichiometric dianhydride, this poly(amic acid) was not chemically imidized nor end-capped. Instead the poly(amic acid) solution was pressure filtered through a 5 micron filter, spin coated onto a silicon wafer and thermally cured by standard methods to a polyimide film. DSC analysis (10° C./min.) of the resulting polyimide film showed a melting point of 315° C. during the first heating scan, no crystallization exotherm upon the subsequent cooling and no melting point during the subsequent reheat indicating that any crystallinity in this sample was not readily recoverable once taken above the polymer melting point. This in contrast to the results of Example 3 in which the molecular weight of the polyimide was controlled/limited and the crystallinity was fully recoverable.

EXAMPLE 10 (Comparative)

Preparation of Polyimide Based on BPDA/ODPA//APB-1 34/PA 74.25/24.75//100/2—(75/25 BPDA/ODPA Ratio)-(99% of Stoichiometric Dianhydride, Chemical Imidization)—For Comparison to Example 3

In a similar manner to Example 3 but with a 99% stoichiometric ratio of dianydride to diamine, a polyimide was prepared with 9.9044 g of APB-134, 7.3983 g of BPDA, 2.6002 g ODPA and 0.1003 g of PA. (Gel permeation chromatography (GPC) analysis of the intermediate poly (amic acid) solution (prior to imidization) indicated the weight average molecular weight was 280,000.) DSC analysis (10° C./min.) of the resulting polyimide showed a melting point of 347° C. during the first heating scan, a small crystallization exotherm upon the subsequent cooling at 260° C., and a larger crystallization exotherm at 255° C. and a melting point of 335° C. during the subsequent reheat indicating recoverable crystallinity from the melt, but with lower melting point and slow crystallization kinetics, indicating the effect of molecular weight on thermal transitions and crystallization kinetics.

EXAMPLE 11 (Comparative)

Preparation of Polyimide Based on BPDA/APB-134/PA 98/100/4 98% of Stoichiometric Dianhydride)

BPDA (14.414 g, 0.04899 mole) and DMAC (175 ml) were mixed together to form a slurry (solubility of BPDA is very low in DMAC). With stirring, PA (0.296 g) was added to the slurry and then APB-134 (14.617 g, 0.05 mole) was added to the stirred slurry. The resulting mixture was stirred overnight at ambient temperature to afford a BPDA/APB-1 34/PA polyamic acid solution, which was established to have the following characteristic; $\eta_{inh}$=0.86 deciliter/gram (dl/g).

The above polyamic acid solution was chemically imidized to BPDA/APB-134 homopolyimide endcapped with PA using the procedure which follows. To the above polyamic acid solution were added with stirring TEA (0.72 ml) and AA (1.08 ml), and the resulting mixture was stirred at 30° C. for 18 hours with gellation being noted of the sample after about 1 hour at 30° C. The resulting polyimide was isolated in methanol in a Waring blender using a ratio of approximately 10 g of polymer solution to 500 ml of methanol. An additional Waring blender treatment with 500 ml of methanol was done after filtration before drying at 200° C. under nitrogen and vacuum to constant weight.

In this example, the resulting polyimide was characterized by DSC using the following test methodology. The DSC testing was done with three heat scans from ambient temperature to at least 410° C. with a subsequent cooling scan between each heat scan. Glass transition temperature ($T_g$), crystallization temperature ($T_c$), and melting temperature ($T_m$) were determined for each scan. The crystallization temperature was taken to be the peak of the DSC output for the crystallization transition and the melting temperature was taken to be the peak of the DSC output for the melting transition. For this BPDA/APB-134 homopolyimide, the measured $T_m$ was 403° C. for the second heat and 404° C. for the first heat. The measured $T_g$s were 200° C. ($2^{nd}$ heat) and 218° C. ($3^{rd}$ heat) and the $T_c$ ($2^{nd}$ heat) was measured as 222° C. The observed melting point is considered too high for a readily melt-processible polyimide.

EXAMPLE 12 (Comparative)

Preparation of Polyimide Based on BTDA//APB-134/PA 95//100/10—(95% of Stoichiometric Dianhydride)

Into a 100 ml round bottom flask equipped with a mechanical stirrer and nitrogen purge were charged 3.8055 g (0.0130174 mole) of APB-134 and ~29 ml of NMP. After dissolution of the diamine, 3.9848 g (0.0123663 mole) of BTDA was added with stirring under nitrogen and rinsed in with ~3 ml NMP. After 3 hrs 0.1929 g (0.0013023 mole) PA were added. The reaction was allowed to proceed overnight with stirring under nitrogen. The following day, 4.95 ml (0.052 mole) acetic anhydride and 7.26 ml (0.052 mole) of triethylamine were added to the poly(amic acid) solution to effect imidization. After about 30 minutes, the polymer precipitated, any clumps were broken up by manual manipulation of the mechanical stirrer and stirring was continued for about 6 hrs. The resulting polymer slurry was then added to methanol in a blender to complete precipitation and remove NMP. The polymer was separated by filtration, washed with methanol, and then dried at ~200° C. overnight under vacuum with a nitrogen bleed. DSC analysis (10° C./min, ambient to 450° C.) of the resulting polyimide showed multiple peaks with the highest melting peak at 439° C. during the first heating scan, a crystallization exotherm upon the subsequent cooling at 389° C. and multiple melting peaks at 418° C. and 439° C. during the subsequent reheat indicating recoverable crystallinity from the melt, but at a melting temperature considered too high for conventional thermoplastic melt processing.

EXAMPLE 13 (Comparative)

Preparation of Polyimide Based on BTDA/ODPA// APB-134/PA 85.5/9.5//100/10—(90/10 BTDA/ODPA ratio)-(95% of Stoichiometric Dianhydride)

In a similar manner to Example 12, a polyimide was prepared with 3.8129 g of APB-134, 3.5933 g of BTDA, 0.3844 g ODPA, 0.1932 g of PA and the appropriate amounts of acetic anhydride and triethylamine. DSC analysis (10° C./min, ambient to 450° C.) of the resulting polyimide showed multiple peaks with the highest melting peak at 434° C. during the first heating scan, a crystallization exotherm upon the subsequent cooling at 376° C. and a melting peak at 411° C. during the subsequent reheat indicating recoverable crystallinity from the melt, but at a melting temperature considered too high for conventional thermoplastic melt processing.

EXAMPLE 14 (Comparative)

Preparation of Polyimide Based on BTDA/ODPA// APB-134/PA 71.25/23.75/100/10—(75/25 BTDA/ODPA Ratio)-(95% of Stoichiometric Dianhydride)

Into a 250 ml round bottom flask equipped with a mechanical stirrer and nitrogen purge were charged 9.6074 g (0.0328638 mole) of APB-134 and 60 ml of NMP. After dissolution of the diamine, 7.5451 g (0.0234155 mole) of BTDA, 2.4213 g (0.0078052 mole) of ODPA and 0.4867 g (0.003286 mole) PA were added with stirring under nitrogen and rinsed in with 20 ml NMP. The reaction was allowed to proceed overnight with stirring under nitrogen. The following day, 12.40 ml (0.1314 mole) acetic anhydride and 18.32 ml (0.1314 mole) of triethylamine were added to the poly (amic acid) solution to effect imidization. After some time, the polymer precipitated, any clumps were broken up by manual manipulation of the mechanical stirrer and stirring was continued for about 6 hrs. The resulting polymer slurry was then added to methanol in a blender to complete precipitation and remove NMP. The polymer was separated by filtration, washed with methanol, and then dried at ~200° C. overnight under vacuum with a nitrogen bleed. DSC analysis (10° C./min, ambient to 450° C.) of the resulting polyimide showed multiple peaks with the highest melting peak at 425° C. during the first heating scan, a crystallization exotherm upon the subsequent cooling at 362° C. and a melting peak of 403° C. during the subsequent reheat indicating recoverable crystallinity from the melt, but at a melting temperature considered too high for conventional thermoplastic melt processing.

EXAMPLE 15

Preparation of Polyimide Based on BTDA/ODPA// APB-134/PA 47.5/47.5/100/10—(50/50 BTDA/ODPA Ratio)-(95% of Stoichiometric Dianhydride)

In a similar manner to Example 14, a polyimide was prepared with 9.6074 g of APB-134, 5.0301 g of BTDA, 4.8426 g ODPA and 0.4867 g of PA. DSC analysis (10° C./min, ambient to 425° C.) of the resulting polyimide showed multiple peaks with the highest melting peak at 401° C. during the first heating scan, a crystallization exotherm upon the subsequent cooling at 343° C. and a melting point of 381° C. during the subsequent reheat indicating recoverable crystallinity from the melt.

EXAMPLE 16

Preparation of Polyimide Based on BTDA/ODPA// APB-134/PA 23.75/71.25//100/10—(25/75 BTDA/ODPA Ratio)-(95% of Stoichiometric Dianhydride)

In a similar manner to Example 14, a polyimide was prepared with 9.6074 g of APB-134, 2.5150 g of BTDA, 7.2639 g ODPA and 0.4867 g of PA. DSC analysis (10° C./min, ambient to 425° C.) of the resulting polyimide showed multiple peaks with the highest melting peak at 374° C. during the first heating scan, no clearly defined crystallization exotherm upon the subsequent cooling, but a crstallization exotherm at 302° C. followed by a melting peak at 349° C. during the subsequent reheat indicating recoverable crystallinity from the melt, but with slow crystallization kinetics.

EXAMPLE 17

Preparation of Polyimide Based on BPDA/ODPA// 3,4'-ODA//PA 85.5/9.5//100//10—(90/10 BPDA/ODPA Ratio)-(95% of Stoichiometric Dianhydride)

Into a 250 ml round bottom flask equipped with a mechanical stirrer and nitrogen purge were charged 8.0732 g (0.0403 mole) of diamine 3,4'-ODA and 60 ml of NMP. After dissolution of the diamine, 10.1422 g (0.03447 mole) of dianhydride BPDA, 1.1882 g (0.00383 mole) of dianhydride ODPA, and 0.5972 g (0.00403 mole) phthalic anhydride were added with stirring under nitrogen and rinsed in with 20 ml NMP. The following day, 14.46 ml (0.153 mole) of acetic anhydride (4×moles of diamine) and 21.36 ml (1.53 mole) of triethylamine (4×moles of diamine) were added to the poly(amic acid) solution to effect imidization. After about 10 minutes the polymer precipitated, any clumps were broken up by manual manipulation of the mechanical stirrer, and stirring was continued for about 6 hrs. The resulting polymer slurry was then added to methanol in a blender to complete precipitation and remove NMP. The polymer was separated by filtration, washed with methanol, and then dried at ca. 200° C. overnight under vacuum with a nitrogen bleed. DSC analysis (10° C./min.) of the resulting polyimide showed a melting point of 379° C. during the first heating scan, no crystallization exotherm upon the subsequent slow cooling and a melting point of 377° C. during the subsequent reheat indicating recoverable crystallinity from the melt.

Fast cooling of this material from the melt resulted in an amorphous material exhibiting only a $T_g$ (glass transition temperature).

EXAMPLE 18 (Comparative)

Preparation of Polyimide Based on BPDA/ODPA// 3,4'-ODA//PA 76/19//100//10—(80/20 BPDA/ODPA Ratio)-(95% of Stoichiometric Dianhydride)

In a similar manner to Example 17 a polyimide was prepared with 8.9874 g BPDA, 2.3690 g ODPA, 8.0482 g 3,4'-ODA, and 0.5953 g phthalic anhydride. DSC analysis (10° C./min) of the resulting polyimide showed a melting point of 357° C. during the first heating scan, no crystallization exotherm upon the subsequent cooling and no melting point during the subsequent reheat indicating that higher levels of ODPA adversely effect recoverable crystallinity from the melt in this composition.

EXAMPLE 19 (Comparative)

Preparation of Polyimide Based on BPDA/ODPA// 3,4'-ODA//PA 66.5/28.5//100//10—(70/30 BPDA/ODPA Ratio)-(95% of Stoichiometric Dianhydride)

In a similar manner to Example 17 a polyimide was prepared with 7.8379 g BPDA, 3.5418 g ODPA, 8.0215 g 3,4'-ODA, and 0.5933 g phthalic anhydride. DSC analysis (10° C./min) of the resulting polyimide showed a melting point of 341° C. during the first heating scan, no crystallization exotherm upon the subsequent cooling and no melting point during the subsequent reheat indicating that higher levels of ODPA adversely effect recoverable crystallinity from the melt in this composition.

EXAMPLE 20

Preparation of Polyimide Based on BPDA/ODPA// 3,4'-ODA/PPD//PA 90.25/4.75//95/5//10—(95/5 BPDA/ODPA Ratio)-(95% of Stoichiometric Dianhydride)

In a similar manner to Example 17 a polyimide was prepared with 10.8236 g BPDA, 0.6006 g ODPA, 7.7540 g 3,4'-ODA, 0.2204 g PPD and 0.6038 g phthalic anhydride. DSC analysis (10° C./min) of the resulting polyimide showed a melting point of 383° C. during the first heating scan, a crystallization exotherm upon the subsequent cooling at 287° C. and a melting point of 381 ° C. during the subsequent reheat indicating recoverable crystallinity from the melt.

EXAMPLE 21

Preparation of Polyimide Based on BPDA/ODPA// 3,4'-ODA/PPD//PA 85.5/9.5//95/5//10—(90/10 BPDA/ODPA Ratio)-(95% of Stoichiometric Dianhydride)

In a similar manner to Example 17 a polyimide was prepared with 10.2373 g BPDA, 1.1993 g ODPA, 7.7414 g 3,4'-ODA, 0.2200 g PPD and 0.6028 phthalic anhydride. DSC analysis (10° C./min) of the resulting polyimide showed a melting point of 376° C. during the first heating scan, a crystallization exotherm upon the subsequent cooling at 280° C. and a melting point of 372° C. during the subsequent reheat indicating recoverable crystallinity from the melt.

EXAMPLE 22

Preparation of Polyimide Based on BPDA/ODPA// 3,4'-ODA/PPD//PA 76/19//95/5//10—(80/20 BPDA/ODPA Ratio)-(95% of Stoichiometric Dianhydride)

In a similar manner to Example 17 a polyimide was prepared with 9.0714 g BPDA, 2.3912 g ODPA, 7.7172 g 3,4'-ODA, 0.2194 g PPD and 0.6009 g phthalic anhydride. DSC analysis (10° C./min) of the resulting polyimide showed a melting point of 356° C. during the first heating scan, a crystallization exotherm upon the subsequent cooling at 265° C. and a melting point of 352° C. during the subsequent reheat indicating recoverable crystallinity from the melt and also the beneficial property of PPD addition (compare to Example 18).

EXAMPLE 23

Preparation of Polyimide Based on BPDA/ODPA// 3,4'-ODA/4,4'-ODA//PA 90.25/4.75//80/20//10— (95/5 BPDA/ODPA Ratio)-(95% of Stoichiometric Dianhydride)

In a similar manner to Example 17 a polyimide was prepared with 10.7230 g BPDA, 0.5951 g ODPA, 6.4690 g 3,4'-ODA, 1.6173 g 4,4'-ODA and 0.5981 g phthalic anhydride. DSC analysis (10° C./min) of the resulting polyimide showed a melting point of 370° C. during the first heating scan, a crystallization exotherm upon the subsequent cooling at 305° C. and a melting point of 367° C. during the subsequent reheat indicating recoverable crystallinity from the melt.

EXAMPLE 24

Preparation of Polyimide Based on BPDA/ODPA// 3,4'-ODA/4,4'- ODA//PA 85.5/9.5//90/10//10—(90/ 10 BPDA/ODPA Ratio)-(95% of Stoichiometric Dianhydride)

In a similar manner to Example 1 a polyimide was prepared with 10.1418 g BPDA, 1.1881 g ODPA, 7.2656 g 3,4'-ODA, 0.8073 g 4,4'-ODA and 0.5972 g phthalic anhydride. DSC analysis (10° C./min) of the resulting polyimide showed a melting point of 371° C. during the first heating scan, a crystallization exotherm upon the subsequent cooling at 262° C. and a melting point of 370° C. during the subsequent reheat indicating recoverable crystallinity from the melt.

EXAMPLE 25

Preparation of Polyimide Based on BPDA/ODPA// 3,4'-ODA/4,4'-ODA//PA 85.5/9.5//80/20//10—(90/ 10 BPDA/ODPA Ratio)-(95% of Stoichiometric Dianhydride)

In a similar manner to Example 17 a polyimide was prepared with 10.1418 g BPDA, 1.1881 g ODPA, 6.4583 g 3,4'-ODA, 1.6146 g 4,4'-ODA and 0.5972 g phthalic anhydride. DSC analysis (10° C./min) of the resulting polyimide showed a melting point of 363° C. during the first heating scan, a crystallization exotherm upon the subsequent cooling at 293° C. and a melting point of 362° C. during the subsequent reheat indicating recoverable crystallinity from the melt.

EXAMPLE 26 (Comparative)

Preparation of the Polyimide Based on BPDA//3,4'-ODA//PA 93//100//14—(93% of Stoichiometric Dianhydride)

The diamine (3,4'-ODA), dianhydride (BPDA) and phthalic anhydride were weighed directly into a 3 liter nitrogen purged resin kettle in the amounts listed in the table below. The resin kettle was then fitted with a three neck cover, an overhead mechanical stirring system (Cole-Palmer Master Servodyne electric drive with a 50:1 gear ratio and a Hastelloy mixing blade) and nitrogen purge. The apparatus was assembled and the finely powdered monomers were mixed in the vessel for one hour at room temperature under inert gas purge.

To initiate melt polymerization, the kettle was lowered, via hydraulic lab jack, into a liquid metal bath (Patriot Alloys, Alloy-281) preheated to 280° C. by a 220 volt band heater. The following thermal schedule (bath temperature) was followed during the polymerization:

| TIME (MIN) | TEMPERATURE (° C.) |
|---|---|
| 0 | 280 |
| 0–26 | 280–400 |
| 26–44 | 400 |
| 44–64 | 400–425 |
| 64–75 | 425 |

Polymerization was observed to proceed upon melting of the monomers and the water of imidization was conveniently removed from the reactor via inert gas purge. Melt viscosity increased dramatically during the course of the polymerization. Total polymerization time was 75 minutes.

At the conclusion of the polymerization, the heat source was removed and the viscous polymer was manually discharged from the reaction vessel and allowed to cool to room temperature. The polymer exhibited a $T_g$=244° C., $T_c$=262° C., $\Delta Hc$=23 J/g, $T_m$=391° C., and $\Delta Hm$=27 J/g by DSC analysis (10° C./min.). The $T_m$ that was observed for this homopolyimide is considered in general too high and/or borderline for a melt polymerization/processing operation.

| Monomers | Abbreviation | Amount (g) | Moles |
|---|---|---|---|
| 3,4'-oxydianiline | (3,4'-ODA) | 320.38 | 1.600 |
| 3,3',4,4'-biphenyltetracarboxylic dianhydride carboxylic dianhydride | (BPDA) | 437.77 | 1.488 |
| Phthalic Anhydride | (PA) | 33.18 | 0.224 |

EXAMPLE 27 (Comparative)

Preparation of the Polyimide Based on BPDA/ODPA//3,4'-ODA//PA 75.2/18.8//100//12—(94% of Stoichiometric Dianhydride, 80/20 BPDA/ODPA Ratio)

The diamine (3,4'-ODA), dianhydrides (BPDA, ODPA) and phthalic anhydride were weighed directly into a 3 liter nitrogen purged resin kettle in the amounts listed in the table below. The resin kettle was then fitted with a three neck cover, an overhead mechanical stirring system (Cole-Palmer Master Servodyne electric drive with a 50:1 gear ratio and a Hastelloy mixing blade) and nitrogen purge. The apparatus was assembled and the finely powdered monomers were mixed in the vessel for one hour at room temperature under inert gas purge.

To initiate melt polymerization, the kettle was lowered, via hydraulic lab jack, into a liquid metal bath (Patriot Alloys, Alloy-281) preheated to 280° C. by a 220 volt band heater. Immediately after applying the preheated bath, the temperature was increased at 4.6° C./min. to 400° C. Polymerization was observed to proceed upon melting of the monomers and the water of imidization was conveniently removed from the reactor via inert gas purge. Melt viscosity increased dramatically during the course of the polymerization. Once at 400° C. the bath was held at 400° C. for 8 additional minutes. Total polymerization time was 65 minutes.

At the conclusion of the polymerization, the heat source was removed and the viscous polymer was manually discharged from the reaction vessel and allowed to cool to room temperature. The polymer exhibited a $T_g$=241° C. by DSC (10° C./min.), but did not show any significant peaks related to crystallinity in the sample as prepared.

| Monomers | Abbreviation | Amount (g) | Moles |
|---|---|---|---|
| 3,4'-oxydianiline | (3,4'-ODA) | 320.38 | 1.6000 |
| 4,4'-oxydiphthalic anhydride | (ODPA) | 93.31 | 0.3009 |
| 3,3',4,4'-biphenyltetracarboxylic dianhydride | (BPDA) | 353.98 | 1.2032 |
| Phthalic Anhydride | (PA) | 28.44 | 0.1920 |

Even though this composition includes an aromatic dianhydride component in the form of BPDA in combination with ODPA in an 80/20 BPDA/ODPA ratio, an aromatic diamine in the form of 3,4'-ODA, and an endcapping component in the form of PA, this composition is outside the scope of the present invention because it does not exhibit recoverable crystallinity.

EXAMPLE 28

Preparation of the Polyimide Based on BPDA/ODPA//3,4'-ODA//PA 89.3/4.7//100//12—(94% of Stoichiometric Dianhydride, 95/5 BPDA/ODPA Ratio)

In a similar manner to Example 27, the chosen monomers, in the amounts listed below, were polymerized to polyimide. The preheat temperature was 280° C., the temperature ramp was 6° C./min, and the final temperature was 420° C., and the polymerization time was 75 minutes. The polymer exhibited in the second DSC heat scan a $T_g$=244° C., $T_c$=321° C., $\Delta H_c$=20 J/g, $T_m$=385° C., and $\Delta H_m$=19 J/g by DSC analysis (10° C./min.)

| Monomers | Abbreviation | Amount (g) | Moles |
|---|---|---|---|
| 3,4'-oxydianiline | (3,4'-ODA) | 320.38 | 1.6000 |
| 4,4'-oxydiphthalic anhydride | (ODPA) | 23.33 | 0.0752 |
| 3,3',4,4'-biphenyltetracarboxylic dianhydride | (BPDA) | 420.35 | 1.4287 |
| Phthalic Anhydride | (PA) | 28.44 | 0.1920 |

EXAMPLE 29

Preparation of the Polyimide Based on BPDA/ODPA//3,4'-ODA//PA 85.5/9.51/100//10—(95% of Stoichiometric Dianhydride, 90/10 BPDA/ODPA Ratio).

In a similar manner to Example 27, the chosen monomers, in the amounts listed below, were polymerized to polyimide. The preheat temperature was 273° C., the temperature ramp was 6.25° C./min, and the final temperature was 411 ° C., and the polymerization time was 72 minutes. The polymer exhibited in a second DSC heat scan a $T_g$=246° C., $T_c$=344°

C. $\Delta H_c$=3.0 J/g, $T_m$=347° C., $\Delta H_m$=2.7 J/g by DSC analysis (10° C./min.).

| Monomers | Abbreviation | Amount (g) | Moles |
|---|---|---|---|
| 3,4'-oxydianiline | (3,4'-ODA) | 320.38 | 1.600 |
| 4,4'-oxydiphthalic anhydride | (ODPA) | 47.15 | 0.152 |
| 3,3',4,4'-biphenyltetracarboxylic dianhydride | (BPDA) | 402.46 | 1.368 |
| Phthalic Anhydride | (PA) | 23.70 | 0.160 |

EXAMPLE 30

Preparation of the Polyimide Based on BPDA/ODPA//3,4'-ODA//PA 89.70/4.75//100//10—(94.5% of Stoichiometric Dianhydride, 95/5 BPDA/ODPA Ratio) Containing Graphite and Teflon® Fillers In a similar manner to Example 27, the chosen monomers along with graphite and Teflon® fillers, in the amounts listed below, were polymerized to polyimide. The preheat temperature was 280° C., the temperature ramp was 6.5° C./min, and the final temperature was 400° C., and the polymerization time was 60 minutes. The polymer exhibited in the second DSC heat scan a $T_g$=247° C., $T_c$=271° C., $\Delta H_c$=0.9 J/g, $T_m$=377° C., $\Delta H_m$=11 J/g by DSC analysis (10° C./min.).

| Monomers | Abbreviation | Amount (g) | Moles |
|---|---|---|---|
| 3,4'-oxydianiline | (3,4'-ODA) | 320.38 | 1.600 |
| 4,4'-oxydiphthalic anhydride | (ODPA) | 23.58 | 0.076 |
| 3,3',4,4'-biphenyltetracarboxylic dianhydride | (BPDA) | 422.22 | 1.435 |
| Phthalic Anhydride | (PA) | 23.70 | 0.160 |
| Graphite (Dixon) | | 118.50 | |
| Teflon (MP-1500) | | 1.58 | |

EXAMPLE 31

Preparation of the Polyimide Based on BPDA/ODPA//3,4'-ODA//PA 90.25/4.75//100//10—(95% of Stoichiometric Dianhydride, 95/5 BPDA/ODPA Ratio) Containing Graphite and Teflon® Fillers.

In a similar manner to Example 27, the chosen monomers along with graphite and Teflon® fillers, in the amounts listed below, were polymerized to polyimide. The preheat temperature was 294° C., the temperature ramp was 5° C./min, and the final temperature was 420° C., and the polymerization time was 60 minutes. The polymer exhibited a $T_g$=248° C., a $T_m$=324° C., $\Delta H_m$=2.2 J/g, a $T_m$=377° C., and a $\Delta H_m$=8.3 J/g by DSC analysis (10° C./min.).

| Monomers | Abbreviation | Amount (g) | Moles |
|---|---|---|---|
| 3,4'-oxydianiline | (3,4'-ODA) | 320.38 | 1.600 |
| 4,4'-oxydiphthalic anhydride | (ODPA) | 23.58 | 0.076 |
| 3,3',4,4'-biphenyltetracarboxylic dianhydride | (BPDA) | 424.82 | 1.444 |
| Phthalic Anhydride | (PA) | 23.70 | 0.160 |
| Graphite (Dixon) | | 118.80 | |
| Teflon (MP-1500) | | 79.20 | |

EXAMPLE 32

Preparation of Polyimide Based on BPDA/ODPA//APB-134/PA 61.4/33.6/100/10 (all are Weight Percentages)—(64.6/35.4 BPDA/ODPA Ratio)-(95% of Stoichiometric Dianhydride) Via Melt Polymerization Approximately twenty-two pounds of a pre-blended powder mixture of 1,3-bis(4-aminophenoxy)benzene (APB-134, 10.9 lbs., 16.9 moles), 3,3',4,4'-biphenyltetracarboxylic dianhydride (BPDA, 6.7 lbs., 10.4 moles), 4,4'-oxydiphthalic anhydride (ODPA, 3.9 lbs., 5.7 moles) and phthalic anhydride (PA, 0.6 lbs., 1.7 moles) were continuously fed thru an inlet opening of a Werner & Pfleiderer ZSK-30 (30 mm) twin-screw extruder (Krupp Werner & Pfeiderer Corp., Ramsey, New Jersey) into the first barrel zone ranging from 16 to 32° C. as controlled by circulating cooling water only. The screws were continuously turning at 56 to 180 revolutions per minute. The reaction mixture was conveyed through the cooled first zone and the next two barrel zones maintained at temperatures of 85 to 111° C. and 142 to 158° C., respectively. The reaction mixture continued on through a fourth zone maintained at a temperature of 164 to 216° C., and having an opening in the upper section of the wall, where water of reaction was continuously removed through an opening provided. The reaction mixture was further conveyed through zones number five and six that were maintained at 280 to 310° C. and 321 to 371° C., respectively, and on through zone seven maintained at 346 to 353° C. where a second opening in the upper section of the wall removed additional water of reaction. The reaction mixture continued through zones eight and nine maintained at 332 to 343° C. and 343 to 347° C., respectively, on through zone ten at 349 to 351° C. where a third opening in the upper section of the wall removed additional water of reaction and/or initial bubbles that may have been formed in the mixture. An eleventh zone maintained at 360 to 372° C. led to a fourth opening in the upper of the wall of zone twelve maintained at 351 to 353° C., where the final amount of water of reaction and/or bubbles that may have been formed in the mixture were removed. A thirteenth zone maintained at 347 to 354° C. then led to a die discharge where the polyimide product was continuously extruded.

EXAMPLE 33

Preparation of Polyimide Based on BPDA/ODPA//3,4'-ODA/PA 90.25/4.75/100/10, Plus 15 Weight Percent Graphite to 85 Weight Percent of Total monomers—(95/5 BPDA/ODPA Ratio)-(95% of Stoichiometric Dianhydride) Via Melt Polymerization Example 32 was repeated except that a pre-blended powder mixture of approximately fifteen pounds of 3,4'-oxydianiline (3,4'-ODA, 5.2 lbs., 11.7 moles), 3,3',4,4'-biphenyltetracarboxylic dianhydride (BPDA, 6.9 lbs., 10.6 moles), 4,4'-oxydiphthalic anhydride (ODPA, 0.4 lbs., 0.6 moles), phthalic anhydride (PA, 0.4 lbs., 1.2 moles) and graphite (2.25 lbs. for 15% total weight %) was continuously fed through an inlet opening of the Werner & Pfleiderer twin-screw extruder into the first barrel zone maintained at 15° C. by circulating cooling water. The screws were continuously turning at 100 RPM. The reaction mixture was conveyed through the cooled first zone and the next two barrel zones maintained at temperatures of 60 to 64° C. and 142 to 154° C., respectively. The reaction mixture continued on through a fourth zone maintained at a temperature of 210 to 232° C., and having an opening in the upper section of the wall, where water of reaction was continuously removed through the opening provided. The reaction mixture was further conveyed through zones number five and six that were maintained at 292 to 306° C. and 341 to 353° C., respectively, and on through zone seven maintained at 365 to 370° C., where a second opening in the upper section of the wall removed additional water of reaction. The reaction mixture continued through zones eight and nine maintained at 369 to 383° C. and 369 to 385° C., respectively, on through zone ten maintained at 368 to 388° C., where a third opening in the upper section of the wall removed additional water of reaction and/or initial bubbles that may have been formed in the mixture. An eleventh zone maintained at 379 to 395° C. led to a fourth opening in the upper section of the wall of zone twelve maintained at 370 to 390° C., where the final amount of water of reaction and/or bubbles that may have been formed in the mixture were removed. A thirteenth zone maintained at 363 to 390° C. then led to a die discharge where the polyimide product was continuously extruded.

EXAMPLE 34

Preparation of Polyimide Based on BPDA/ODPA// APB-134/PA 61.75/33.25/100/10 (all are Weight Percentages)—(65/35 BPDA/ODPA Ratio)-(95% of Stoichiometric Dianhydride) Via Melt Polymerization Approximately ten pounds of a pre-blended powder mixture of 1,3-bis(4-aminophenoxy)benzene (APB-134, 4.9 lbs., 7.7 moles), 3,3',4,4'-biphenyl-tetracarboxylic dianhydride (BPDA, 3.1 lbs., 4.7 moles), 4,4'-oxydiphthalic anhydride (ODPA, 1.8 lbs., 2.6 moles) and phthalic anhydride (PA, 0.2 lbs., 0.8 moles) were continuously fed through an inlet opening of a Berstorff ZE-25 (25 mm) twin-screw extruder (Berstorff Corp., Florence, Ky.) into the first barrel zone maintained at 15° C. by circulating cooling water. The screws were continuously turning at 100 to 150 RPM. The reaction mixture was conveyed through the cooled first zone and the next three barrel zones maintained at temperatures of 105° C., 150° C. and 200° C., respectively. The reaction mixture continued on through a fifth zone having an opening in the upper section of the wall and maintained at a temperature of 250° C., where water of reaction was continuously removed through the opening provided. The reaction mixture was further conveyed through zone number six that was maintained at 300° C., and on through zone seven at 340° C. to a second opening in the upper section of the wall where the final amount of water of reaction and/or bubbles that may have been formed in the mixture were removed. An eighth zone maintained at 350° C. then led to a die discharge where the polyimide product was continuously extruded. The polyimide polymer produced in this example exhibited an intrinsic viscosity in phenolic media of 0.73 dl. per gram.

This polyimide was subjected to DSC analysis and exhibited in the initial heat scan a glass transition temperature of 207° C., a crystallization temperature of 294° C., and a melting point of 333° C. and exhibited in the second heat scan a glass transition temperature of 206° C., a crystallization temperature of 292° C., and a melting point of 334° C. This polyimide exhibited a melt index of 17.3 when measured at 350° C.

Three additional melt polymerization runs were made with this same monomer feed composition which afforded identical results within experimental error. For first, second, and third of these additional runs, the measured DSC values in the second heat scan were respectively 210, 211 and 209° C. for glass transition temperature, and 335, 336, and 329° C. for melting point. For first, second, and third of these additional runs, respectively, the polyimide exhibited melt index values of 16.2. 17.1, and (not determined for the third run), all being measured at 350° C.

EXAMPLE 35 (Comparative)

Preparation of Polyimide Based on BPDA/ODPA// APB-134/PA 47.5/47.5/100/10 (all are Weight Percentages)—(50/50 BPDA/ODPA Ratio)-(95% of Stoichiometric Dianhydride) Via Melt Polymerization Example 34 was repeated except that the monomer ingredients were individually fed from four separate loss-in-weight feeders into the Berstorff twin-screw extruder that was extended with two additional barrel zones. Approximately twenty pounds of a powder monomer mixture of 15.3 moles of 1,3-bis(4-aminophenoxy)benzene (APB-134), 7.2 moles of 3,3',4,4'-biphenyltetracarboxylic dianhydride (BPDA), 7.2 moles of 4,4'-oxydiphthalic anhydride (ODPA) and 1.5 moles phthalic anhydride (PA) were continuously fed through an inlet opening of the Berstorff twin-screw extruder into the first barrel zone maintained at 15° C. by circulating cooling water. The screws were continuously turning at 100 RPM. The reaction mixture was conveyed through the cooled first zone and the next two barrel zones maintained at temperatures of 105 and 150° C., respectively. The reaction mixture continued on through a fourth zone maintained at 200° C. and having an opening in the upper section of the wall where water of reaction was continuously removed through the opening provided. The reaction mixture was further conveyed through zones number five and six that were maintained at 250° C. and 300° C., respectively, and on through zone seven at 340° C. where a second opening in the upper section of the wall removed additional water of reaction and/or initial bubbles that may have been formed in the mixture. The reaction mixture was further conveyed through zone number eight that was maintained at 350° C., and on through zone nine at 350° C. to a third opening in the upper section of the wall where the final amount of water of reaction and/or bubbles that may have been formed in the mixture were removed. A tenth zone maintained at 350° C. then led to a die discharge where the polyimide product was continuously extruded.

This polyimide was subjected to DSC analysis and exhibited in the first heat scan a glass transition temperature of 201° C. and a melting point of 244° C. and exhibited in the second heat scan a glass transition temperature of 208° C. and which did not exhibit a melting point in the second heat scan. This polyimide exhibited a melt index of 26.3 when measured at 350° C. This a comparative example because the melting point (first DSC heat scan) is too low for dimensional stability and integrity in high temperature applications and the polyimide does not exhibit recoverable crystallinity.

EXAMPLE 36 (Comparative)

Preparation of Polyimide Based on BPDA/ODPA// APB-134/PA 14.25/80.75/100/10 (all are Weight Percentages) (15/85 BPDA/ODPA Ratio)-(95% of Stoichiometric Dianhydride) Via Melt Polymerization Example 34 was repeated except that approximately fifteen pounds of the powder monomer mixture of 11.4 moles of 1,3-bis(4-aminophenoxy)benzene (APB-134), 1.7 moles of 3,3',4,4'-biphenyltetracarboxylic dianhydride (BPDA), 9.2 moles of 4,4'-oxydiphthalic anhydride (ODPA) and 1.1 moles phthalic anhydride (PA) was continuously fed through an inlet opening of the Berstorff twin-screw extruder into the first barrel zone maintained at 15° C. by circulating cooling water. The screws were continuously turning at 100 RPM. The reaction mixture was conveyed through the cooled first zone and the next two barrel zones maintained at temperatures of 105° C. and 150° C., respectively. The reaction mixture continued on through a fourth zone maintained at 200° C. and having an opening in the upper section of the wall where water of reaction was continuously removed through the opening provided. The reaction mixture was further conveyed through zones number five and six that were maintained at 250° C. and 300° C., respectively, and on through zone seven at 340° C., where a second opening in the upper section of the wall removed additional water of reaction and/or initial bubbles that may have been formed in the mixture. The reaction mixture was further conveyed through zone number eight that was maintained at 350° C., and on through zone nine at 350° C. to a third opening in the upper section of the wall where the final amount of water of reaction and/or bubbles that may have been formed in the mixture were removed. A tenth zone maintained at 350° C. then led to a die discharge where the polyimide product was continuously extruded.

This polyimide was subjected to DSC analysis and exhibited in the first heat scan a glass transition temperature of 201° C. and a melting point of 257° C. and exhibited in the second heat scan a glass transition temperature of 207° C. and which did not exhibit a melting point in the second heat scan. This polyimide exhibited a melt index of 14.6 when measured at 350° C. This is a comparative example because the melting point (first DSC heat scan) is too low for dimensional stability and integrity in high temperature applications and the polyimide does not exhibit recoverable crystallinity.

EXAMPLE 37

Preparation of Polyimide Based on BPDA/ODPA// APB-134/PA 76/19/100/10—(80/20 BPDA/ODPA Ratio)-(95% of Stoichiometric Dianhydride) Via Melt Polymerization Example 36 was repeated except that approximately fifteen pounds of the powder monomer mixture of 11.6 moles of 1,3-bis(4-aminophenoxy)benzene (APB- 134), 8.8 moles of 3,3',4,4'-biphenyltetracarboxylic dianhydride (BPDA), 2.2 moles of 4,4'-oxydiphthalic anhydride (ODPA) and 1.2 moles phthalic anhydride (PA) was continuously fed through an inlet opening of the Berstorff twin-screw extruder into the first barrel zone maintained at 15° C. by circulating cooling water. The screws were continuously turning at 100 RPM. The reaction mixture was conveyed through the cooled first zone and the next two barrel zones maintained at temperatures of 105° C. and 150° C., respectively. The reaction mixture continued on through a fourth zone maintained at 200° C. and having an opening in the upper section of the wall, where water of reaction was continuously removed through the opening provided. The reaction mixture was further conveyed through zones number five and six that were maintained at 250° C. and 300° C., respectively, and on through zone seven at 340° C., where a second opening in the upper section of the wall removed additional water of reaction and/or initial bubbles that may have been formed in the mixture. The reaction mixture was further conveyed through zone number eight that was maintained at 350° C., and on through zone nine at 350° C. to a third opening in the upper section of the wall where the final amount of water of reaction and/or bubbles that may have been formed in the mixture were removed. A tenth zone maintained at 350° C. then led to a die discharge where the polyimide product was continuously extruded.

This polyimide was subjected to DSC analysis and exhibited in the first heat scan a glass transition temperature of 205° C., a crystallization temperature of 239° C., and a melting point of 357° C. and exhibited in the second heat scan a glass transition temperature of 202° C., a crystallization temperature of 336° C., and a melting point of 354° C. This polyimide exhibited a melt index of 65.3 when measured at 350° C.

EXAMPLE 38 (Comparative)

Preparation of Polyimide Based on BPDA/ODPA// 3,4'-ODA/PA 47.5/47.5/100/10 (all are Weight Percentages)-(50/50 BPDA/ODPA Ratio)-(95% of Stoichiometric Dianhydride) Via Melt Polymerization Example 38 was repeated except that approximately seven pounds of the powder monomer mixture of 6.3 moles of 3,4'-oxydianiline (3,4'-ODA), 3.0 moles of 3,3',4,4'-biphenyltetracarboxylic dianhydride (BPDA), 3.0 moles of 4,4'-oxydiphthalic anhydride (ODPA) and 0.6 moles phthalic anhydride (PA) was continuously fed through an inlet opening of the Berstorff twin-screw extruder into the first barrel zone maintained at 15° C. by circulating cooling water. The screws were continuously turning at 100 RPM. The reaction mixture was conveyed through the cooled first zone and the next three barrel zones maintained at temperatures of 50° C., 125° C. and 175° C., respectively. The reaction mixture continued on through a fifth zone having an opening in the upper section of the wall and maintained at a temperature of 250° C., where water of reaction was continuously removed through the opening provided. The reaction mixture was further conveyed through zone number six that was maintained at 300° C., and on through zone seven at 340° C. where a second opening in the upper section of the wall removed additional water of reaction and/or initial bubbles that may have been formed in the mixture. The reaction mixture was further conveyed through zone number eight that was maintained at 350° C., and on through zone nine at 350° C. to a third opening in the upper section of the wall where the final amount of water of reaction and/or bubbles that may have been formed in the mixture were removed. A tenth zone maintained at 350° C. then led to a die discharge where the polyimide product was continuously extruded.

This polyimide was subjected to DSC analysis and exhibited in the first heat scan a glass transition temperature of 235° C. and a melting point of 343° C. and exhibited in the second heat scan a glass transition temperature of 234° C. and which did not exhibit a melting point in the second heat scan. This polyimide exhibited a melt index of 52.0 when measured at 375° C. This is a comparative example because the polyimide did not exhibit recoverable crystallinity (even though its melting point is in a suitable range).

EXAMPLE 39

Preparation of Polyimide Based on BPDA/ODPA// APB-134/PA 61.75/33.25/100/10 (all are Weight Percentages)-(65/35 BPDA/ODPA Ratio)-(95% of Stoichiometric Dianhydride) Via Melt Polymerization Example 35 was repeated except that the monomer ingredients were individually fed from four separate loss-inweight feeders into the Berstorff twin-screw extruder that was extended with two additional barrel zones. Approximately fifteen pounds of the powder monomer mixture of 4.6 moles of 1,3-bis(4-aminophenoxy)benzene (APB-134), 2.8 moles of 3,3',4,4'-biphenyltetracarboxylic dianhydride (BPDA), 1.5 moles of 4,4'-oxydiphtalic anhydride (ODPA) and 0.5 moles phthalic anhydride (PA) were continuously fed through an inlet opening of a Berstorff twin-screw extruder into the first barrel zone maintained at 15° C. by circulating cooling water. The screws were continuously turning at 100 RPM. The reaction mixture was conveyed through the cooled first zone and the next two barrel zones maintained at temperatures of 105° C. and 150° C., respectively. The reaction mixture continued on through fourth and fifth zones maintained at 250° C. and 300° C., respectively, and with each having an opening in the upper section of the wall, where water of reaction was continuously removed through the openings provided. The reaction mixture was further conveyed through zone number six that was maintained at 350° C., and on through zone seven at 350° C. where a third opening in the upper section of the wall removed additional water of reaction and/or initial bubbles that may have been formed in the mixture. The reaction mixture was further conveyed through zone number eight that was maintained at 350° C., and on through zone nine at 350° C. to a fourth opening in the upper section of the wall where the final amount of water of reaction and/or bubbles that may have been formed in the mixture were removed. A tenth zone maintained at 350° C. then led to a die discharge where the polyimide product was continuously extruded.

This polyimide was subjected to DSC analysis and exhibited in the first heat scan a glass transition temperature of 220° C. and a melting point of 333° C. and exhibited in the second heat scan a glass transition temperature of 208° C., a crystallization temperature of 332° C., and a melting point of 338° C. This polyimide exhibited a melt index of 66.4 when measured as 350° C.

EXAMPLE 40

Preparation of Polyimide Based on ODPA//APB-133/PA 103/100/3 (all are Weight Percentages)—(no BPDA, no APB-134)-(97% of Stoichiometric Dianhydride) Via Melt Polymerization Approximately twenty pounds of a pre-blended powder mixture of 1,3-bis(3-aminophenoxy)benzene (APB-133, 9.7 lbs., 15.1 moles), 4,4'-oxydiphtalic anhydride (ODPA, 10 lbs., 14.6 moles) and phthalic anhydride (PA, 0.3 lbs., 0.9 moles) was continuously fed through an inlet opening of the Werner & Pfleiderer twin-screw extruder into the first barrel zone ranging from 12 to 103° C. as controlled by circulating cooling water only. The screws were continuously turning at 80 to 150 RPM. The reaction mixture was conveyed through the cooled first zone and the next two barrel zones maintained at temperatures of 47 to 115° C. and 107 to 151 ° C., respectively. The reaction mixture continued on through a fourth zone maintained at a temperature of 169 to 196° C., and having an opening in the upper section of the wall, where water of reaction was continuously removed through the opening provided. The reaction mixture was further conveyed through zones number five and six that were maintained at 226 to 255° C. and 265 to 310° C., respectively, and on through zone seven maintained at 329 to 332° C., where a second opening in the upper section of the wall removed additional water of reaction. The reaction mixture continued through zones eight and nine at 317 to 334° C. and 328 to 333° C., respectively, on through zone ten maintained at 328 to 331° C. where a third opening in the upper section of the wall removed additional water of reaction and/or initial bubbles that may have been formed in the mixture. An eleventh zone maintained at 333 to 341° C. led to a fourth opening in the upper section of the wall of zone twelve maintained at 329 to 332° C., where the final amount of water of reaction and/or bubbles that may have been formed in the mixture were removed. A thirteenth zone maintained at 328 to 333° C. then led to a die discharge where the polyimide product was continuously extruded.

What is claimed is:

1. A melt-processable, thermoplastic copolyimide comprising a reaction product of components comprising:
    (I) an aromatic dianhydride component consisting essentially of:
        (A) 3,3',4,4'-biphenyltetracarboxylic dianhydride (BPDA); and
        (B) 4,4'-oxydiphthalic anhydride (ODPA);
    (II) an aromatic diamine component selected from the group consisting of 1,3-bis(4-aminophenoxy)benzene (APB-134); 3,4'-oxydianiline (3,4'-ODA); 3,4'-oxydianiline (3,4'-ODA) and 4,4'-oxydianiline (4,4'-ODA) in combination; 3,4'-oxydianiline (3,4'-ODA) and 1,4-diaminobenzene (PPD) in combination; 1,3-bis(4-aminophenoxy)benzene (APB-134) and 4,4'-oxydianiline (4,4'-ODA) in combination; and 1,3-bis(4-aminophenoxy)benzene (APB-134) and 1,4-diaminobenzene (PPD) in combination; and
    (III) an endcapping component;
wherein the copolyimide has a stoichiometry in the range from 93% to 98%, has either a molar ratio of 3,3',4,4'-biphenyltetracarboxylic dianhydride/4,4'-oxydiphthalic anhydride (BPDA/ODPA) of greater than or equal to 60/40 but less than or equal to 95/5, exhibits a melting point in the range of 330° C. to 385° C., and exhibits recoverable crystallinity as determined by differential scanning calorimetry analysis.

2. The copolyimide of claim 1 wherein the aromatic diamine component is 1,3-bis(4-aminophenoxy,)benzene (APB-134).

3. The copolyimide of claim 2 wherein the molar ratio of 3,3',4,4'-biphenyltetracarboxylic dianhydride/4,4'-oxydiphthalic anhydride (BPDANODPA) is in the range from 65/35 to 90/10.

4. The copolyimide of claim 3 wherein the molar ratio of 3,3',4,4'-biphenyltetracarboxylic dianhydride/4,4'-oxydiphthalic anhydride (BPDA/ODPA) is in the range from 70/30 to 85/15.

5. The copolyimide of claim 2 wherein the molar ratio of 3,3',4,4'-biphenyltetracarboxylic dianhydride/4,4'-oxydiphthalic anhydride (BPDA/ODPA) is in the range from 75/25 to 95/5, wherein the copolyimide exhibits a crystallization peak upon cooling from a melt of the copolyimide in a cooling scan with cooling at 10° C./minute during differential scanning calorimetry analysis and does not exhibit an observable crystallization peak upon subsequent reheat above 180° C. to the melt in a reheat scan during differential scanning calorimetry analysis, and the copolyimide is characterized in that it exhibits fast kinetics of crystallization from the melt of the copolyimide.

6. The copolyimide of claim 2 wherein the molar ratio of 3,3',4,4'-biphenyltetracarboxylic dianhydride/4,4'-oxydipthalic anhydride (BPDA/ODPA) is in the range from 60/40 to 70/30, wherein the copolyimide exhibits a crystallization peak upon subsequent reheat above 180° C. to the melt in a reheat scan during differential scanning calorimetry analysis, and the copolyimide is characterized in that it exhibits slow kinetics of crystallization from the melt of the copolyimide.

7. The copolyimide of claim 1 wherein the aromatic diamine component is 3,4'-oxydianiline (3,4'-ODA), and the molar ratio of 3,3',4,4'-biphenyltetracarboxylic dianhydride/ 4,4'-oxydiphthalic anhydride (BPDA/ODPA) is in the range from 85/15 to 95/5.

8. The copolyimide of claim 1 wherein the aromatic diamine component is 3,4'-oxydianiline (3,4'-ODA) and 4,4'-oxydianiline (4,4'-ODA) in combination, the molar ratio of 3,3',4,4'-biphenyltetracarboxylic dianhydride/4,4'-oxydipthalic anhydride (BPDANODPA) is in the range from 80/20 to 95/5, and the molar ratio of 3,4'-oxydianiline/4,4'-oxydianiline (3,4'-ODA/4,4'-ODA) is in the range from 75/25 to 95/5.

9. The copolyimide of claim 1 wherein the aromatic diamine component is 3,4'-oxydianiline (3,4'-ODA) and 1,4-diaminobenzene (PPD) in combination, the molar ratio of 3,3',4,4'-biphenyltetracarboxylic dianhydride/4,4'-oxydiphthalic anhydride (BPDA/ODPA) is in the range from 80/20 to 95/5, and the molar ratio of 3,4'-oxydianiline/1,4-diaminobezene (3,4'-ODA/PPD) is in the range from 90/10 to 95/5.

10. The copolyimide of claim 1 wherein the reaction product is obtained by solution polymerization.

11. The copolyimide of claim 1 further comprising a filler.

12. A method of preparing a melt-processible polyimide composition by melt polymerization comprising the steps of:

(a) blending, to substantial homogeneity, components comprising:

(I) 93 to 98 mole parts of an aromatic dianhydride component consisting essentially of:
  (A) 3,3',4,4'-biphenyltetracarboxylic dianhydride (BPDA); and
  (B) 4,4 -oxydiphthalic anhydride (ODPA);

(II) 100 mole parts of an aromatic diamine component selected from the group consisting of 1,3-bis(4-aminophenoxy)benzene (APB-134), 3,4'-oxydianiline (3,4'-ODA); 3,4'-oxydianiline (3,4'-ODA) and 4,4'-oxydianiline (4,4'-ODA) in combination; 3,4'-oxydianiline (3,4'-ODA) and 1,4-diamino-benzene (PPD) in combination; 1,3-bis(4-aminophenoxy)benzene (APB-134) and 4,4'-oxydianiline (4,4'-ODA) in combination; and 1,3-bis(4-aminophenoxy)-benzene (APB-134) and 1,4-diaminobenzene (PPD) in combination; and (III) 4 to 14 mole parts of at least one endcapping component; wherein the dianhydride component has a molar ratio of 3,3',4,4'-biphenyltetra-carboxylic dianhydride/4,4'-oxydiphthalic anhydride (BPDA/ODPA) of greater than or equal to 60/40 but less than or equal to 95/5;

the components (I), (II) and (III) being in substantially solventless form and the blending step producing a substantially solventless component blend;

the blending step being carried out at a temperature below the melting point of any of components (I), (II) and (III);

the components (I) and (II) being present in the component blend in a molar ratio of (I):(II) from 0.93 to 0.98;

the component (III) being present in the component blend in a molar ratio (III):(II) of 0.04 to 0.14;

(b) heating the substantially solventless component blend produced in step (a) to a predetermined melt processing temperature at which the (I) aromatic dianhydride component and the (II) aromatic diamine component are melted and react to form a melt of a polyimide; the predetermined melt processing temperature being less than the temperature at which the polyimide melt chemically decomposes;

(c) mixing the component blend and the polyimide melt produced therefrom during the heating step (b);

(d) removing water of reaction from the component blend and the polyimide melt produced therefrom during the heating step (b);

(e) forming the polyimide melt into an article having predetermined shape; and (f) cooling the article having predetermined shape to ambient temperature;

wherein the polyimide exhibits a melting point in the range of 330° C. to 385° C. and the polyimide exhibits recoverable crystallinity as determined by DSC analysis.

13. The process of claim 12 wherein the aromatic diamine component is 1,3-bis(4-aminophenoxy)benzene (APB-134).

14. The process of claim 12 wherein the endcapping component is selected from the group consisting of phthalic anhydride, naphthalic anhydride, and aniline.

15. The process of claim 12 wherein the article having predetermined shape is selected from the group consisting of a film, a fiber, a sheet, a tube, an extrudate strand that is cut into a pellet, a coating on a wire, a compression-molded article, and a blow-molded article.

16. The process of claim 12 wherein the steps (a)–(e) are carried out in an extruder.

17. The process of claim 16 wherein the extruder contains sequential zones 1 through x, where x is about 2 to about 10, the component blend and the polyimide melt produced therefrom being passed through the sequential zones, each of the zones being heated to a temperature less than the predetermined melt processing temperature, the blending step (a) being carried out in zone 1 at a temperature which is less than the melting temperature of each of the components (I), (II), and (III).

* * * * *